US010198254B2

(12) United States Patent
Sehgal et al.

(10) Patent No.: US 10,198,254 B2
(45) Date of Patent: *Feb. 5, 2019

(54) SURFACING CROSS PLATFORM APPLICATIONS

(71) Applicant: Itron, Inc., Liberty Lake, WA (US)

(72) Inventors: Arun Sehgal, Spokane, WA (US); Shannon M. Votava, Spokane, WA (US); Bruce Angelis, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,488

(22) Filed: Apr. 4, 2016

(65) Prior Publication Data

US 2016/0216961 A1  Jul. 28, 2016

Related U.S. Application Data

(63) Continuation of application No. 13/907,665, filed on May 31, 2013, now Pat. No. 9,342,288.

(51) Int. Cl.
*G06F 8/61* (2018.01)
*G06F 8/65* (2018.01)
(Continued)

(52) U.S. Cl.
CPC .............. *G06F 8/65* (2013.01); *G06F 8/61* (2013.01); *G06Q 20/123* (2013.01); *H04L 67/34* (2013.01)

(58) Field of Classification Search
CPC ..... G06F 8/60; G06F 8/61; G06F 8/65; H04L 67/34; G06Q 20/10; G06Q 20/123
(Continued)

(56) References Cited

U.S. PATENT DOCUMENTS 6,990,662 B2   1/2006  Messer et al.
7,546,595 B1 *  6/2009  Wickham ................. G06F 8/65
                                          717/168
(Continued)

FOREIGN PATENT DOCUMENTS

JP    2006502457      1/2006
JP    2006309516 A    11/2006
(Continued)

OTHER PUBLICATIONS

The Japanese Office Action dated Oct. 11, 2016 for Japanese Patent Application No. 2016-516642, a counterpart foreign application of U.S. Appl. No. 13/907,625, 12 pages.
(Continued)

*Primary Examiner* — Marina Lee
(74) *Attorney, Agent, or Firm* — Lee & Hayes, P.C.

(57) ABSTRACT

A utility application store may be configured to present an interface displaying multiple applications that are available from the utility application store. By accessing the interface of the utility application store, a utility supplier may, with a single request, initiate installation or activation of an application on multiple utility meters or other smart sensors in a utility communication network. The utility application store may be configured to provide notification of the availability of applications for utility meters or other smart sensors, consumer computing devices, and/or utility supplier back office computing devices. The utility application store may include one or more distributed applications that include a first portion configured for execution by a utility meter and one or more other portions configured for execution by another computing device (e.g., a personal computer, mobile device, utility supplier back office server, cloud service, or the like).

20 Claims, 13 Drawing Sheets

(51) Int. Cl.
  *G06Q 20/12*  (2012.01)
  *H04L 29/08*  (2006.01)
(58) Field of Classification Search
  USPC .................................... 717/172, 174, 177
  See application file for complete search history.

(56) References Cited

U.S. PATENT DOCUMENTS

| | | | |
|---|---|---|---|
| 7,783,729 B1* | 8/2010 | Macaluso | G06F 8/63 |
| | | | 455/414.2 |
| 8,495,621 B2* | 7/2013 | Traut | G06F 8/36 |
| | | | 463/42 |
| 8,812,979 B2 | 8/2014 | Khanke et al. | |
| 8,892,699 B2 | 11/2014 | Mann | |
| 8,924,950 B2 | 12/2014 | McDonald et al. | |
| 8,938,730 B2 | 1/2015 | McDonald et al. | |
| 9,167,100 B2 | 10/2015 | Bang | |
| 9,342,288 B2* | 5/2016 | Sehgal | G06F 8/61 |
| 9,785,899 B2 | 10/2017 | Benayon et al. | |
| 2003/0076242 A1 | 4/2003 | Burns et al. | |
| 2003/0084435 A1 | 5/2003 | Messer et al. | |
| 2006/0248162 A1 | 11/2006 | Kawasaki | |
| 2007/0169075 A1 | 7/2007 | Lill et al. | |
| 2009/0222828 A1 | 9/2009 | Lefevre et al. | |
| 2010/0042372 A1 | 2/2010 | Carter et al. | |
| 2010/0169876 A1 | 7/2010 | Mann | |
| 2010/0233961 A1* | 9/2010 | Holden | G06F 13/385 |
| | | | 455/41.3 |
| 2011/0109472 A1 | 5/2011 | Spirakis et al. | |
| 2011/0270721 A1* | 11/2011 | Kusterer | G06Q 30/04 |
| | | | 705/32 |
| 2011/0307101 A1 | 12/2011 | Imes et al. | |
| 2012/0060152 A1 | 3/2012 | Oh et al. | |
| 2012/0095878 A1 | 4/2012 | Feldman et al. | |
| 2012/0198035 A1 | 8/2012 | Matsuura et al. | |
| 2012/0198099 A1 | 8/2012 | Kwon et al. | |
| 2012/0206274 A1 | 8/2012 | LaFrance et al. | |
| 2012/0245870 A1 | 9/2012 | Komano et al. | |
| 2012/0290975 A1 | 11/2012 | Khanke et al. | |
| 2012/0317638 A1* | 12/2012 | Carrara | G06F 21/44 |
| | | | 726/17 |
| 2012/0326883 A1 | 12/2012 | Angelis et al. | |
| 2012/0330494 A1 | 12/2012 | Hendrix et al. | |
| 2013/0027217 A1 | 1/2013 | Jindia | |
| 2013/0046866 A1 | 2/2013 | McKeown et al. | |
| 2013/0050498 A1 | 2/2013 | Kennedy et al. | |
| 2013/0101448 A1* | 4/2013 | Ando | F04C 2/102 |
| | | | 417/410.4 |
| 2013/0114502 A1 | 5/2013 | Joshi et al. | |
| 2013/0205022 A1 | 8/2013 | Kagan et al. | |
| 2013/0339079 A1 | 12/2013 | Benayon et al. | |
| 2014/0040343 A1 | 2/2014 | Nickolov et al. | |
| 2014/0173579 A1 | 6/2014 | McDonald et al. | |
| 2014/0173580 A1 | 6/2014 | McDonald et al. | |
| 2014/0173586 A1 | 6/2014 | Dugan | |
| 2014/0282482 A1 | 9/2014 | Enns et al. | |
| 2014/0349707 A1 | 11/2014 | Bang | |
| 2014/0358482 A1 | 12/2014 | Sehgal et al. | |
| 2014/0358734 A1 | 12/2014 | Sehgal et al. | |
| 2014/0359595 A1 | 12/2014 | Sehgal et al. | |
| 2015/0095900 A1* | 4/2015 | McDonald | G06F 8/65 |
| | | | 717/170 |
| 2015/0227358 A1 | 8/2015 | Lavoie et al. | |
| 2016/0216961 A1* | 7/2016 | Sehgal | G06F 8/61 |
| 2016/0283284 A1 | 9/2016 | Sun et al. | |
| 2016/0323727 A1 | 11/2016 | Lee | |

FOREIGN PATENT DOCUMENTS

| | | |
|---|---|---|
| JP | 2007502560 | 2/2007 |
| JP | 2009217656 A | 9/2009 |
| JP | 2009230422 A | 10/2009 |
| JP | 2010015244 A | 1/2010 |
| JP | 2011015521 A | 1/2011 |
| JP | 2011100464 a | 5/2011 |
| JP | 2011130597 A | 6/2011 |
| JP | 2012059259 A | 3/2012 |
| JP | 2012059260 A | 3/2012 |
| JP | 2012079061 A | 4/2012 |
| JP | 2012113670 A | 6/2012 |
| JP | 2012159924 A | 8/2012 |
| JP | 2012200094 A | 10/2012 |
| JP | 2012252552 A | 12/2012 |
| WO | WO03003200 | 1/2003 |
| WO | WO2010111738 A1 | 10/2010 |
| WO | WO2012154856 A1 | 11/2012 |

OTHER PUBLICATIONS

The Australian Office Action dated Oct. 14, 2016 for Australian patent application No. 2014272284, a counterpart foreign application of U.S. Appl. No. 13/907,625, 5 pages.
The Extended European Search Report dated Nov. 24, 2016 for European patent application No. 14723225.0, 13 pages.
The Japanese Office Action dated Oct. 18, 2016 for Japanese patent application No. 2016-516644, a counterpart foreign application of U.S. Pat. No. 9,342,288, 13 pages.
Mitsui, "Real-time energy-saving management for effective iPhone app corresponding demand monitoring equipment," Instrumentation Control Engineering, 2012, vol. 55, No. 2, 5 pages. (English translation not currently available).
"Windows 8, Microsoft Windows 8, Windows 8.Pro.Enterprise/ Windows RT," Perfect Master, May 1, 2013, 7 pages.
The Extended European Search Report dated Nov. 30, 2016 for European Patent Application No. 14725837.0, 5 pages.
The Japanese Office Action dated Dec. 27, 2016 for Japanese Patent Application No. 2016-516645, a counterpart foreign application of U.S. Appl. No. 13/907,688, 7 pages.
Knapp et al., "Applied Cyber Security and the Smart Grid: Implementing Security Controls into the Modern Power Infrastructure," Syngress, Apr. 19, 2013, 10 pages.
Tanenbaum et al., "Distributed Systems: Principles and Paradigms (2nd Edition)," Prentice Hall, Oct. 12, 2006, 86 pages.
The Australian Office Action dated Jun. 23, 2016 for Australian Patent Application No. 2014272286, a counterpart foreign application of U.S. Appl. No. 13/907,665, 3 pages.
The Australian Office Action dated Jun. 23, 2016 for Australian patent application No. 2014272287, a counterpart foreign application of U.S. Appl. No. 13/907,688, 2 pages.
The Australian Office Action dated Jun. 24, 2016 for Australian Patent Application No. 2014272284, a counterpart foreign application of U.S. Appl. No. 13/907,625, 2 pages.
Office action for U.S. Appl. No. 13/907,688, dated Feb. 11, 2016, Sehgal et al., "Distributed Applications Across Platforms," 12 pages.
Office Action for U.S. Appl. No. 13/907,665, dated Feb. 23, 2015, Arun Sehgal, "Surfacing Cross Applications," 16 pages.
Office Action for U.S. Appl. No. 13/907,665, dated Sep. 11, 2015, Arun Sehgal, "Surfacing Cross Platform Applications," 17 pages.
PCT Search Report and Written Opinion dated Aug. 29, 2014 for PCT Application No. PCT/US14/31777, 8 pages.
PCT Search Report and Written Opinion dated Dec. 16, 2014 for PCT Application No. PCT/US14/31780, 9 pages.
The PCT Search Report and Written Opinion dated Apr. 2, 2015 for PCT application No. PCT/US2014/031783, 8 pages.
Office action for U.S. Appl. No. 13/907,688, dated Jul. 27, 2016, Sehgal, "Distributed Applications Across Platforms," 18 pages.
The Japanese Office Action dated Sep. 12, 2017 for Japanese patent application No. 2016-516645, a counterpart foreign application of U.S. Appl. No. 13/907,688.
The Australian Office Action dated Jun. 16, 2017 for Australian patent application No. 2014272287, a counterpart foreign application of U.S. Appl. No. 13/907,688, 6 pages.
The Australian Office Action dated Jun. 21, 2017 for Australian patent application No. 2014272284, a counterpart foreign application of U.S. Appl. No. 13/907,625, 5 pages.

(56) References Cited

OTHER PUBLICATIONS

The European Office Action dated May 29, 2017 for European Patent Application No. 14725836.2, a counterpart foreign application of U.S. Appl. No. 13/907,625, 4 pages.
The Japanese Office Action dated Jun. 27, 2017 for Japanese Patent Application No. 2016-516642, a counterpart foreign application of U.S. Appl. No. 13/907,625, 6 pgs.
The Japanese Office Action dated Jul. 4, 2017 for Japanese patent application No. 2016-516644, a counterpart foreing application of U.S. Pat. No. 9,342,288, 6 pgs.
Office action for U.S. Appl. No. 13/907,688, dated May 4, 2017, Sehgal et al., "Distributed Applications Across Platforms", 16 pages.
Office action for U.S. Appl. No. 13/907,625, dated Jun. 16, 2017, Sehgal et al., "Utility Application Delivery Platform ", 11 pages.
The Australian Office Action dated May 8, 2018 for Australian Patent Application No. 2017204167, a counterpart foreign application of U.S. Appl. No. 13/907,688, 5 pages.
The European Office Action dated Dec. 21, 2017 for European patent application No. 147235836.2, a counterpart foreign application of U.S. Appl. No. 13/907,625, 4 pages.
The Japanese Office Action dated Apr. 3, 2018 for Japanese Patent Application No. 2016-516645, a counterpart foreign application of U.S. Appl. No. 13/907,688.
Office action for U.S. Appl. No. 13/907,625, dated Jan. 8, 2018, Sehgal et al., "Utility Application Delivery Platform", 12 pages.
Office action for U.S. Appl. No. 13/907,688, dated Mar. 8, 2018, Sehgal et al., "Distributed Applications Across Platforms", 25 pages.
The Australian Office Action dated May 23, 2018 for Australian patent application No. 2017204251, a counterpart foreign application of U.S. Appl. No. 13/907,625, 5 pages.
Barry, et. al., "Modern Embedded Computing", Morgan Kaufmann, Feb. 10, 2012, 103 pages.
Coulouris, et. al., "Distributed Systems: Concepts and Design (5th Edition)", May 7, 2011, Addison-Wesley, 696 pages.
The European Office Action dated Aug. 8, 2018 for European Patent Application No. 14725837.0, a counterpart foreign application of U.S. Appl. No. 13/907,688, 9 pages.
The European Office Action dated Jun. 5, 2018 for European patent application No. 14725836.2, a counterpart foreign application of U.S. Appl. No. 13/907,625, 3 pages.
The European Office Action dated Aug. 28, 2018 for European Patent Application No. 14725836.2, a counterpart foreign application of U.S. Appl. No. 13/907,625, 4 pages.
Office action for U.S. Appl. No. 13/907,625, dated Jun. 4, 2018, Sehgal et al., "Utility Application Delivery Platform", 13 pages.
Wikipedia: "Meter data management", retrieved on Jul. 31, 2018, from: <URL:https://en.wikipedia.org/w/index.php?title=Meter_data_management&oldid=513172850>, published on Sep. 17, 2012, 2 pages.
Wikipedia: "Client-server model", Internet Article, May 29, 2013, Retrieved on Jul. 31, 2018 from the Internet: <URL:https://en.wikipedia.org/w/index.phptitle=Clientserver_model&oldid=557254009>, 3 pages.
Wikipedia: "User interface", Internet Article, May 26, 2013, Retrieved on Jul. 31, 2018 from the Internet: <URL:https://en.wikipedia.org/w/index.php?title=User_interface&oldid=556804997>, 8 pages.
Yaghmour, et. al., "Building Embedded Linux Systems", O'Reilly, Aug. 25, 2008, 393 pages.

\* cited by examiner

SURFACING CROSS PLATFORM APPLICATIONS

RELATED APPLICATION

This application is a continuation of and claims priority to U.S. patent application Ser. No. 13/907,665, now U.S. Pat. No. 9,342,288, filed on May 31, 2013, the entirety of which is incorporated by reference herein.

BACKGROUND

Utility meters such as electric, water and natural gas meters have evolved from isolated devices that simply measure utility consumption and display a consumption reading to so called "smart meters" that are connected devices capable of reporting resource consumption readings automatically over a utility communication network. Such meters utilize increasingly complex and specialized software to perform required functions. Unfortunately, the software update process is a difficult one, in which administrators utilize tools that are configured for download of specific software code. Considerable time is spent by network professionals, and each update is a customized event requiring consideration and preparation.

In some instances, utility companies may not even be aware that software or updates are available for devices in their network. Thus, in order to install or update software across their entire network, a utility company must first learn that compatible software is available for devices in their network. Consumers are generally completely unaware of what software is running on the meters servicing the properties, and play no role in its selection and operation.

Once installed, the software has been designed to execute on the smart meter to perform metering functionality and to report metering data to devices in the utility's communication network. Smart meter software has been restricted from communication with devices outside the utility's communication network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
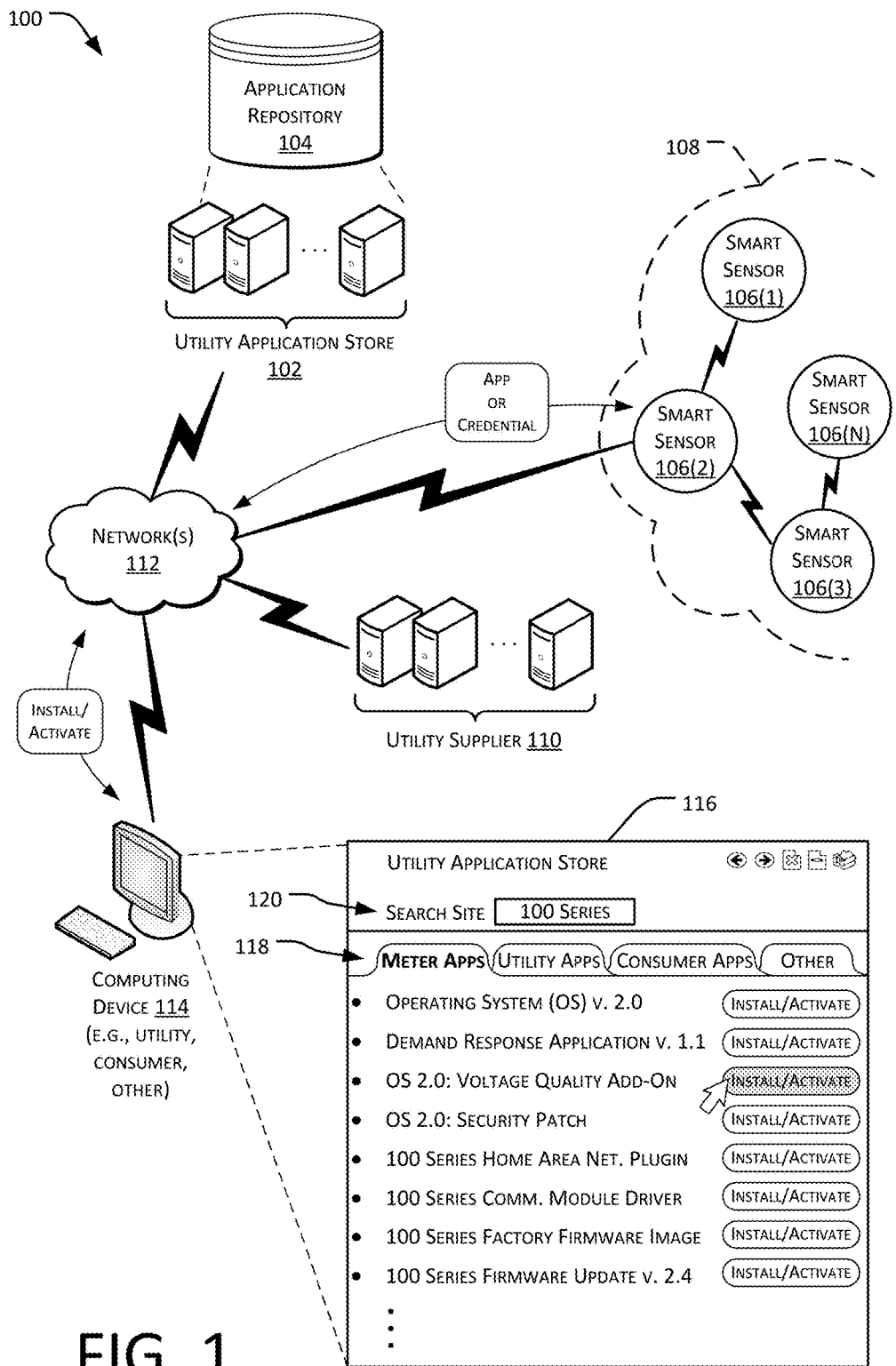
FIG. 1 is a schematic diagram of an example architecture including a utility application store usable to facilitate distribution and installation of applications to one or more smart utility meters, smart sensors, or other network computing devices.

As discussed above, software for smart utility meters is currently only available directly from the respective manufacturers of the smart utility meters, with different manufacturers making the software available in different ways. Utility companies currently lack a centralized location from which they can easily obtain software for the smart utility meters and other devices in their utility communication networks. Existing systems also lack any mechanism to notify utility companies, customers, and other users when applications are available for their smart utility meters, consumer devices, and other computing devices. Still further, existing utility smart meter applications are incapable of communicating with and leveraging applications running on consumer computing devices, utility backend computing devices, and other web services.

This patent application describes a utility application store comprising a repository of applications available for download and installation on one or more smart utility meters or other smart sensors. The term "smart sensor" means a measuring and/or sensing equipment which measures or senses physical parameters (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device. The utility application store may additionally or alternatively include applications available for computing devices other than utility network computing devices, such as personal computers (e.g., desktop computers, laptop computers, etc.), mobile devices (smartphones, tablets, etc.), servers, routers, access points, or the like.

As used herein, the term "application" or "app" means any software or firmware capable of executing on a computing device. Examples of applications include, without limitation, an operating system, an update to an operating system, a software program, an update of a software program, an add-on to a software program, a patch, a plugin, a driver, a firmware image, or a firmware update.

In one aspect, the utility application store may be configured to present an interface displaying multiple applications that are available from the utility application store. By accessing the interface of the utility application store, a utility supplier may, with a single request, initiate installation or activation of one or more applications on multiple utility meters or other smart sensors in the utility's communication network. The multiple utility meters or other smart sensors may comprise a predefined subset (e.g., all meters of a certain model, all meters in a certain geographic region, etc.) of utility meters in the utility's communication network. In some examples, a single application may be installed at a time. However, in other examples, multiple different applications may be installed in a batch or sequentially.

In another aspect, a utility application store or other service may be configured to provide notification of the availability of applications for utility meters or other smart sensors, consumer computing devices, and/or utility back office computing devices. For example, upon receiving a request to install an application on a consumer computing device (e.g., personal computer or mobile device), the utility application store or other service may identify an associated application that is available for a utility meter of a user of the consumer computing device. The utility application store or other service may then send a notification of the availability of the associated application to a utility supplier servicing the utility meter and/or to the consumer computing device.

In yet another aspect, the utility application store may include a distributed application that includes a first portion configured for execution by a utility meter or other smart sensor and a second portion configured for execution by another computing device (e.g., a personal computer, mobile device, utility back office server, cloud service, or the like). In one example, a smart utility meter may have the first portion of the distributed application stored in memory and executable by one or more processors to configure the smart utility meter to cause the second portion of the distributed application installed at a remote computing resource to perform at least a portion of an operation.

Any or all of the foregoing aspects may be performed or made possible by a utility application store, such as that described herein. However, certain aspects described herein may also be accomplished without the need for a utility application store. While many of the examples may be understood in the context of traditional utility supply chains in which utility providing companies (e.g., energy generation companies) supply resources to utility distribution companies, which in turn provide the resources to end customers. The techniques described herein also apply to models in which utility suppliers supply resources to consumers directly or via retailers/vendors, as opposed to through a utility distribution company. As used herein the term "utility supplier" means any provider or distributor of a resource including, without limitation, a utility providing company, a utility distribution company, a smart city, a municipality, a retailer or vendor, a co-op, a micro grid, or an individual.

This brief overview is provided for the reader's convenience and is not intended to limit the scope of the claims, nor the proceeding sections. Furthermore, the techniques described in detail below may be implemented in a number of ways and in a number of contexts. Several example implementations are provided with reference to the following figures, as described below in more detail. However, the following implementations and context are but few of many.

Example Utility Application Store

FIG. 1 is a diagram illustrating an example networked environment or architecture 100 including a utility application store 102. The utility application store or "app store" 102 includes a repository of applications 104 available for installation on one or more utility meters or other smart sensors 106(1), 106(2), 106(3), . . . 106(N) (collectively referred to as "smart sensors 106"), where N is any integer greater than or equal to 1. In the illustrated example, the smart sensors 106 are arranged in a mesh network defining an autonomous routing area 108. However, in other examples, the meters may be arranged in a star network or other network topology. Regardless of the topology of the autonomous routing area 108, individual smart sensors or "nodes" may be in communication by wireless (e.g., radio frequency) and/or wired (e.g., power line communication, Ethernet, serial, etc.) connections. The smart sensors 106 may be configured to collect information (e.g., resource consumption information, network traffic information, weather information, etc.) and to report the collected information to a utility supplier 110 via a wired or wireless network 112, such as the Internet, a cellular network, or the like. The network 112 may itself be made up of one or more other wired and/or wireless networks. In the illustrated example, smart sensor 106(2) acts as a root or edge node of the autonomous routing area 108 to relay communications from other smart sensors 106 in the autonomous routing area 108 to the utility supplier 110 over the network 112. The utility supplier 110 may be representative of a utility distribution company and may include one or more severs or other computing devices, which may be arranged in a single location or in multiple distributed locations. In other examples, the utility supplier 110 may be a utility providing company (e.g., electricity generation company), a smart city, a municipality, a retailer or vendor, a co-op, a micro grid, an individual, or any other provider or distributor of a resource.

The app store repository 104 may include applications designed to run on smart sensors developed by multiple different hardware manufacturers. The app store repository 104 may also include applications designed to run on one or more servers of the utility supplier 110, consumer computing devices 114, or other computing devices. The applications may have been developed by an entity administering the application store 102, one or more utility meter or hardware manufacturers, one or more utility suppliers, and/or one or more independent software vendors. As such, the app store 102 may serve as a central source for all applications that a utility supplier needs for all of the devices in the utility provider's communication network. While the application describes the "utility supplier's communication network" as being owned or administered by the utility provider, in other examples, a separate entity may manage or administer the communication network over which smart sensors and other devices communicate.

Referring back to FIG. 1, a user (e.g., a utility supplier employee, consumer, or other user) may access the utility application store 102 using the computing device 114. Using a web browser or an app store client program resident on computing device 114, the user may access a website or other interface 116 to the utility application store 102. The interface 116 may present a plurality of applications that are available from the app store 102. In the example of FIG. 1, the interface includes multiple tabs 118, each representing a different category of applications available from the app store 102. In the illustrated example, four tabs are shown: meter apps, utility apps, consumer apps, and other. In response to selection of each tab, the interface 116 will display a list or otherwise present applications corresponding to the selected tab/category of application. The interface 116 may also include a search field 120 that may be used to search within the selected tab for applications relevant to an input search term. However, the interface 116 may be configured in any other way suitable to present the applications that are available from the app store 102. For instance instead of having multiple tabs for different categories of users on a single interface, separate interfaces may be presented to users based on their roles. For instance, utility personnel may be presented with only applications for utility computing devices, while consumers may be presented with only applications for consumer computing devices.

In FIG. 1, a user has selected the "meter apps" tab and has input the search query "100 Series." Thus, the interface 116 displays a list of applications for smart meters that are relevant to the search query. From this list, the user may select one or more applications to install or activate. By electing to install an application (e.g., by selection of a download or install control), the user may initiate download or otherwise cause transmission of the application to one or more devices (e.g., meters in this example). By selecting to activate an application, the user may initiate download, cause transmission, or obtain a credential (e.g., key, password, etc.) usable to activate or unlock an application that is already installed (though locked) on the one or more devices. In the illustrated example, each application is shown with the option to "install/activate" the application. However, in other examples, separate controls for "install" and "activate" may be provided, or the interface 116 may only show the relevant controls. In the illustrated example, the user has selected to install or activate the application "OS 2.0: Voltage Quality Add-On." In some examples, selection of the install or activate control alone may be sufficient to initiate the installation or activation. However, in other examples, in response to selection of the install or activate control, the app store 102 may give the user an option to purchase the application.

In some embodiments, the interface 116 may additionally include another tab (not shown) or other interface to display the applications currently installed by the user, on devices of the user, or on devices of an entity with which the user is associated. When present, this tab or interface may also include a list of devices associated with the user or entity and/or provide the ability to update, uninstall, deactivate the applications for each device individually, for classes of device (e.g., device type, model, series, etc.), for devices in a certain geographic area, or the like.

Figure 2:
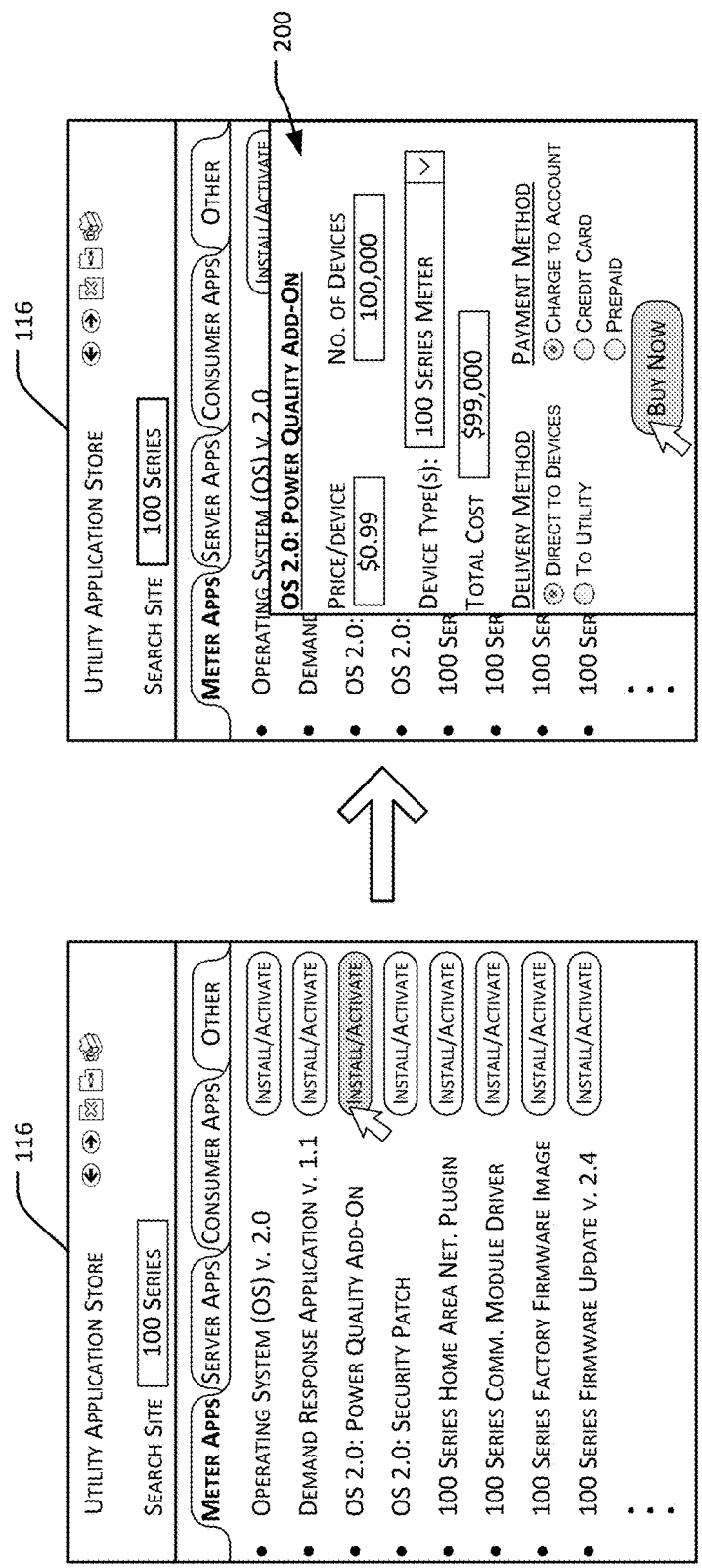
FIG. 2 is a schematic diagram of an example user interface presenting multiple "meter" applications available from a utility application store.

FIG. 2 illustrates an example interface that may be presented to the user to allow the user to purchase the meter application "OS 2.0: Voltage Quality Add-On." As shown, when the user selects to install or activate the application (the left side of FIG. 2), a purchase interface 200 is presented (the right side of FIG. 2) to allow the user to purchase the application. The purchase interface 200 may include a variety of information and/or controls. For instance, in the illustrated example, the purchase interface 200 includes an application "price/device" (shown as $0.99 in this example), a "No. of Devices" field to allow the user to specify the number of devices (in this case 100,000 devices) on which to install the application, and a "Device Type(s)" control to allow the user to specify the type(s) of device(s) on which the application is to be installed. The Device Type(s) control is shown as a drop down menu, but could be a series of radio buttons, check boxes, free text entry fields, or any other control usable to specify one or more device types on which the application is to be installed. In the illustrated example, the Price/Device is the same for all device types, but in other examples the Price/Device may vary depending on the type of device on which the application is to be installed (e.g., a first price for a utility meter and second price for a data collector), the number of devices on which the application is to be installed (e.g., reflecting a volume discount), or the like.

In some examples, the app store 102 may have prior knowledge of the devices associated with the user or an account of the user. In that case, the Device Type(s) control and/or No. of Devices field may be prepopulated with the types and numbers of devices associated with the user or user account. For instance, in the example of FIG. 1, if the app store system 102 is in communication with the utility supplier 110 or otherwise has access to information about the device types and number of each type of device in the utility communication network, the app store 102 may be able to determine which devices in the utility supplier's communication network are compatible with the selected application. The app store 102 may then prepopulate those device types and the number such devices in the purchase interface 200, greatly simplifying the process of purchasing applications across all applicable devices in the utility communication network.

Once the device types and number of devices have been specified (or prepopulated), the purchase interface 200 may display a Total Cost (in this case $99,000) for installation of the application on the specified devices. The purchase interface 200 also includes a "Delivery Method" control allowing the user to specify a preferred delivery method of the application or credential. For instance, in the illustrated example the user is given the option to have the application or credential transmitted directly to the devices over the utility communication network, or to have the application or credential transmitted to the utility supplier 110 for subsequent distribution to the individual devices. The purchase interface 200 also includes a "Payment Method" control to allow the user to specify how to pay for the applications. In FIG. 2, the user is presented with options to "Charge to Account" (e.g., a credit account with the app store or a third party creditor), "Charge to Credit Card," and/or "Prepaid." The Prepaid option may indicate that the user has previously paid for a certain number or dollar value of applications. The prepayment may have taken the form of a one-time payment (e.g., a bulk application purchase), a credit for purchasing another product (e.g., three free applications with the purchase of a new meter), a subscription (e.g., unlimited free apps with subscription), a service or maintenance agreement (e.g., free updates and security patches for 1 year with the purchase of a new software package), or the like. The user may then complete the purchase and initiate the installation or activation by selecting the "Buy Now" control.

Figure 3:
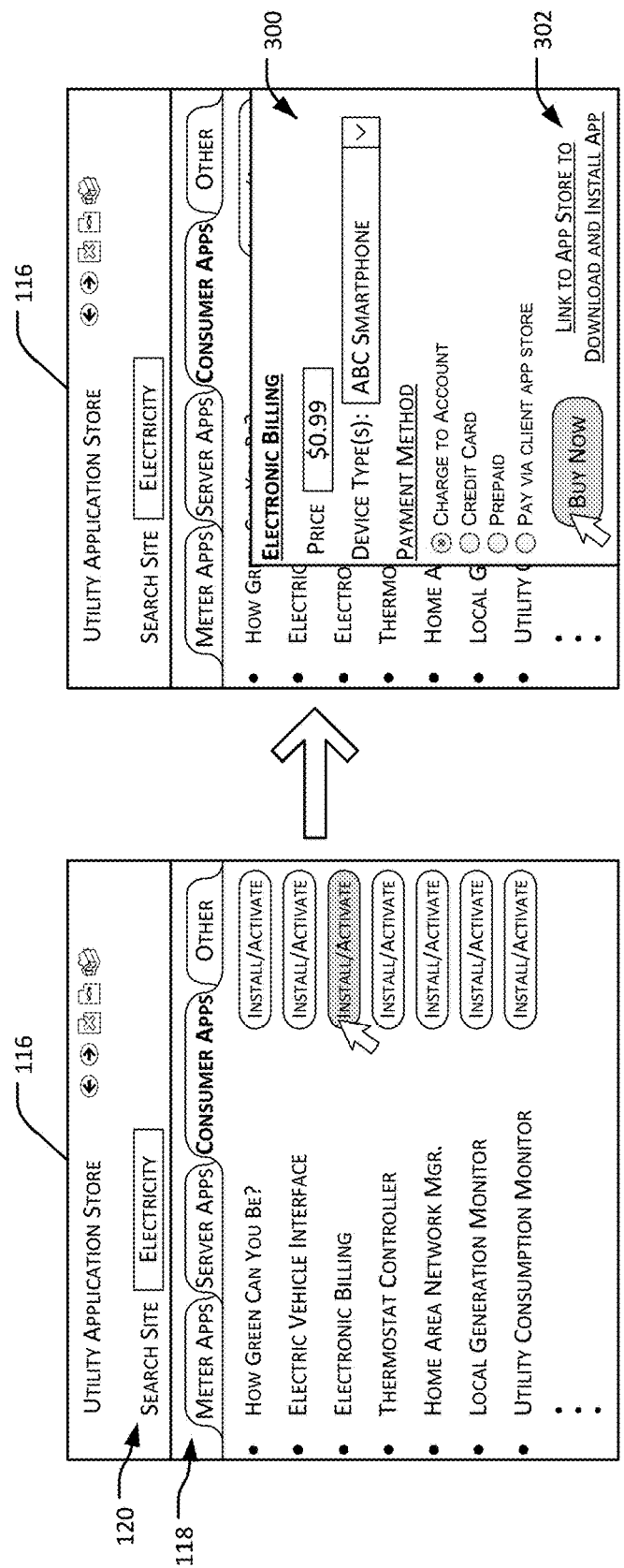
FIG. 3 is a schematic diagram of another example user interface presenting multiple "consumer" applications available from a utility application store.

FIG. 3 illustrates an example interface that may be presented to a user to allow the user to purchase a consumer application "Electronic Billing." In this example, the user has selected the "Consumer Apps" tab from among tabs 118 and has input the search query "Electricity" in the search field 120. Thus, the interface 116 in this example displays consumer focused applications related to the search query "electricity." As shown, when the user selects to install or activate the application (the left side of FIG. 3), a purchase interface 300 is presented (the right side of FIG. 3) to allow the user to purchase the application. In some embodiments, the purchase interface 300 for consumer applications may be the same or similar to the purchase interface 200 for meter applications. However, in the example of FIG. 3, the purchase interface 300 for consumer applications is different in several respects, reflecting the different needs of consumer users. For example, as shown in FIG. 3, the payment interface 300 omits the No. of Devices field, reflecting the fact that consumers typically will be installing the application on a relatively small number of devices. However, in other variations, the payment interface 300 may include the ability to purchase an application for multiple of the same or different devices, much like the payment interface 200 of FIG. 2. As another example different, the Delivery Method control is omitted in FIG. 3, reflecting the fact that consumers typically will have only one way of installing or activating content on their consumer devices. In still other examples, only the tabs pertinent to the user (e.g., based on the user's role) may be displayed to the user. For instance, only the consumer tab may be shown to the user if the user is a consumer.

The payment interface 300 may also include a link 302 to another app store (e.g., an app store associated with a particular consumer device such as the iTunes® store or the Android® store). In some embodiments, the user may be able to pay for the application from the interface 300 and then navigate to the other app store (e.g., iTunes® store or the Android® store) to download the application. In other embodiments, the user may select the link 302 to navigate to the other app store to both purchase and download the application.

Figure 4:
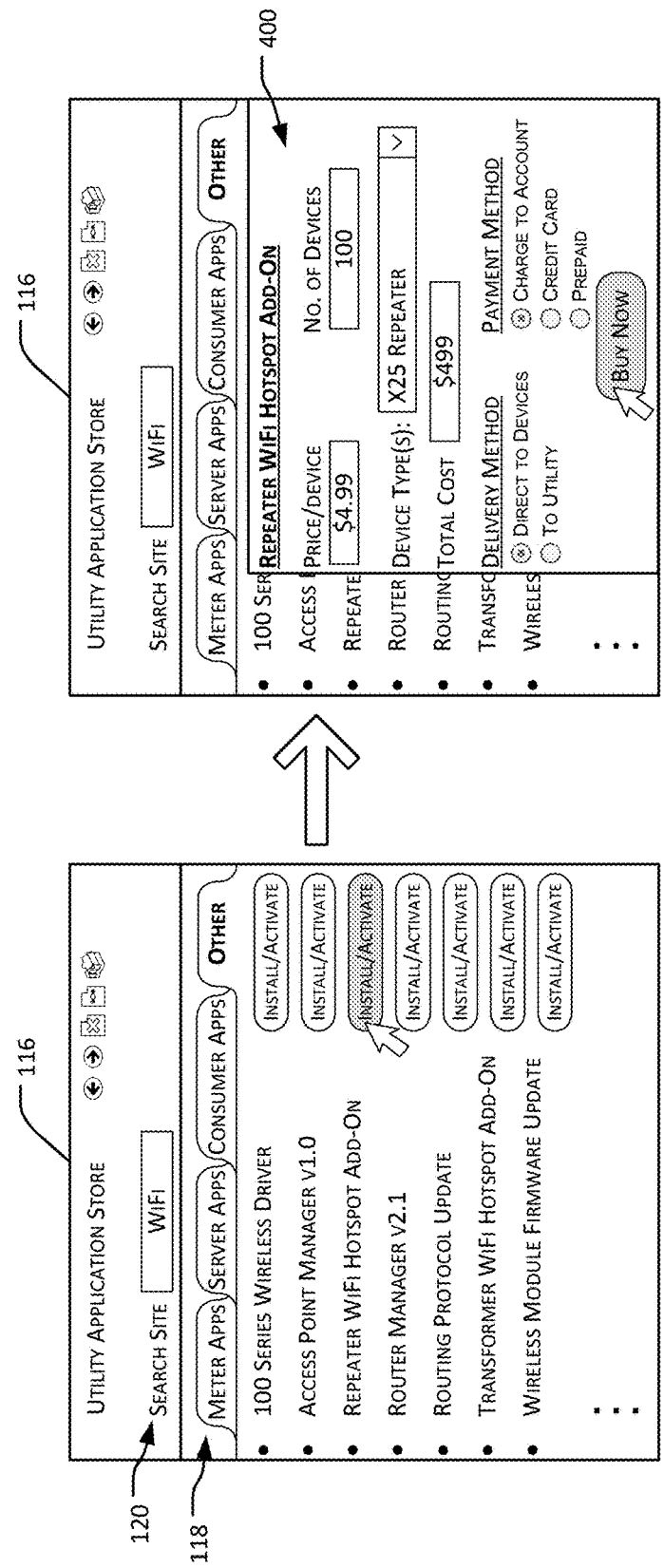
FIG. 4 is a schematic diagram of an example user interface presenting multiple "other" applications available from a utility application store.

FIG. 4 illustrates an example interface that may be presented to a user to allow the user to purchase an application "Repeater WiFi Hotspot Add-On" for an "Other" computing device. In this example, the user has selected the "Other" tab from among tabs 118 and has input the search query "WiFi" in the search field 120. Thus, the interface 116 in this example displays applications for computing devices other than meters and consumer devices, related to the search query "WiFi." As shown, when the user selects to install or activate the application (the left side of FIG. 4), a purchase interface 400 is presented (the right side of FIG. 4) to allow the user to purchase the application. In some embodiments, the purchase interface 400 for other applications may be the same or similar to the purchase interface 200 for meter applications or the purchase interface 300 for consumer applications. Accordingly, additional discussion of the purchase interface 400 are omitted for brevity.

In the example of FIG. 4, a user (e.g., a utility supplier employee) selects to purchase an add-on application for 100 "X25 Repeaters," at a price of $4.99 per application, for a total of $499. The application in this example may comprise an add-on that allows a radio frequency (RF) repeater to function as a WiFi hotspot. The add-on may be a separate application that is installed on the repeater, or may simply be a key, password, or other credential that unlocks functionality of an application that is already installed on the repeater.

Example Utility Application Store System

Figure 5:
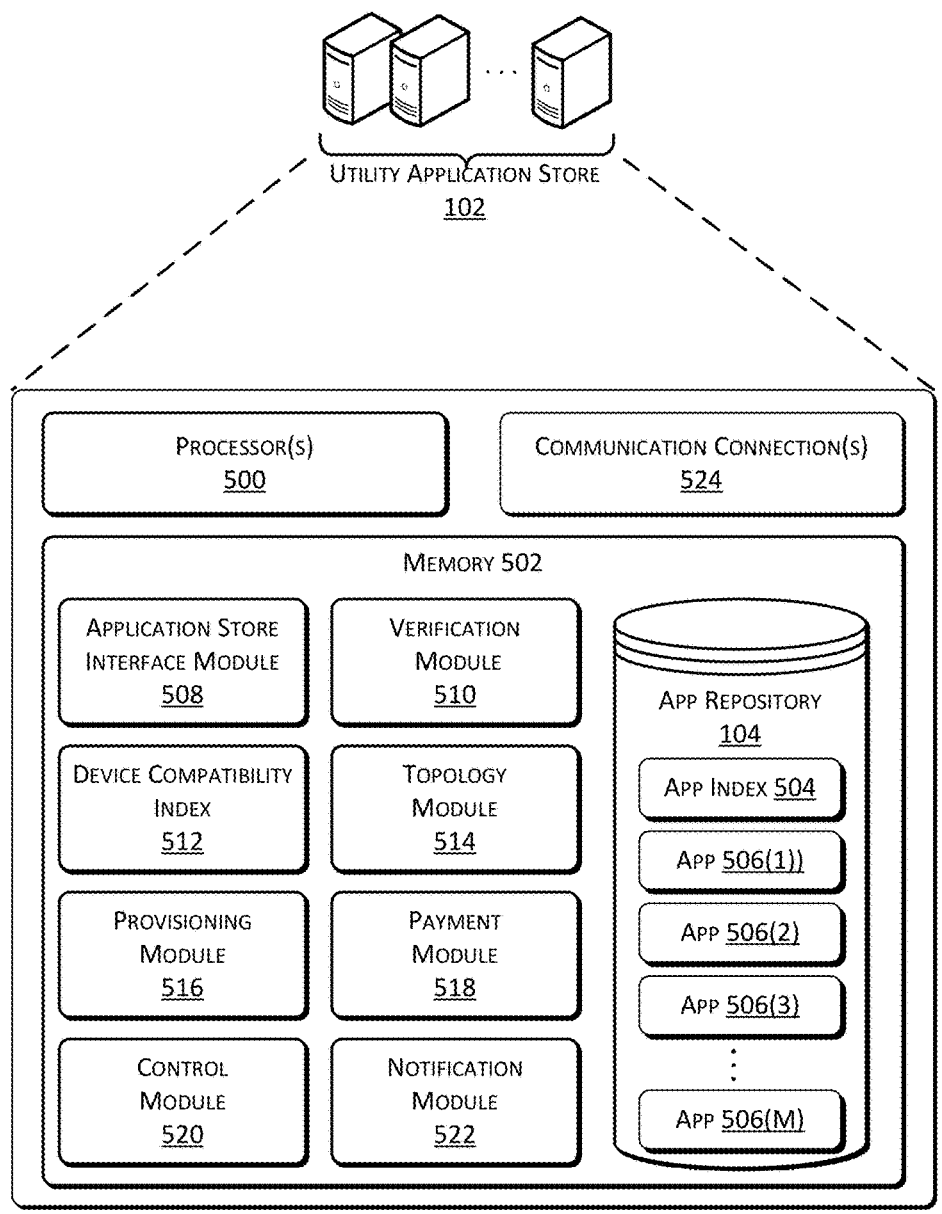
FIG. 5 is a block diagram illustrating details of the example utility application store of FIG. 1.

FIG. 5 illustrates the example utility application store 102 of FIG. 1 in more detail. The utility application store 102 may be configured as or disposed at a server, a cluster of servers, a server farm, a data center, a cloud computing resource, or any other computing resource capable of storing and/or providing access to a plurality of applications for smart sensors and other computing devices. The utility application store 102 may include one or more processors 500 and memory 502. The memory 502 may include an application repository 104 storing an application index 504 and multiple applications 506(1), 506(2), 506(3), . . . 506(M) (collectively referred to as "applications 506") that are available from the utility application store 102, where M is any integer greater than or equal to 1. The application index 504 may include a listing of the applications 506 by topic, category, feature, product, or the like. The application repository 104 may also include metadata associated with the applications 506. By way of example and not limitation, the metadata may include, for each application, a category of the application (e.g., meter application, consumer application, other application, etc.), a version of the application, compatibility of the application with specific software and/or hardware, keywords associated with the applications, brief descriptions of the application, feature specifications of the application, or the like.

The memory 502 may also include a plurality of modules to implement various functions of the utility application store 102. For instance, an application store interface module 508 may be configured to generate a graphical user interface (e.g., interface 116) presenting the applications that are available in the application repository 104. The application store interface module 508 may make the interface available to one or more users by, for example, publishing the interface to a website accessible by a browser of a client computing device. When accessed by the computing device, the application store interface module 508 may serve the interface to the computing device displaying the multiple applications that are available along with controls usable to request installation or activation of the applications.

A verification module 510 may be configured to verify compatibility of one or more applications with one or more computing devices. In response to receiving a request to install or activate an application, a verification module 510 may verify that the requested application is compatible with each of the devices specified in the request. The verification module 510 may make this verification with reference to a device compatibility index 512, the application index (if present), and/or metadata stored in the application repository 104. For instance, the request may include an identifier for each of the devices on which the application is to be installed. In that case, verifying that a compatible version of the application exists for the devices comprises determining, from the identifier of each of the one or more devices, a type of each of the one or more devices, and determining whether a compatible version of the application exists for the determined type of each of the one or more devices. Alternatively, the type of the devices may be specified directly in the request (e.g., each of the device types specified in the payment interface 200).

Additionally or alternatively, if the utility application store 102 has access to information about the devices in the utility communication network, it may make this compatibility verification prior to presenting the available applications to the user. For instance, the memory 502 may store a topology module 514 that is in communication with the utility supplier 110. The topology module 514 may maintain information about the device types, current software versions, and/or locations of devices in the utility supplier's communication network. Alternatively, the memory 502 may maintain a record of all device types for which the user has previously purchased applications, and the versions of applications purchased. In either case, the user may be presented only with applications that are compatible with devices in the utility's own communication network.

A provisioning module 516 may be configured to prepare the application or credential for transmission to the one or more smart sensors or other devices by, for example, segmenting the application or credential into multiple segments, compressing the application or credential, and/or encrypting the application or credential. The provisioning module 516 may also generate credentials (e.g., based on a private key, a random password generator, or the like), or may provide existing credentials (e.g., passwords or certificates) to activate the requested application.

A payment module 518 may be configured to provide a payment interface (e.g., payment interfaces 200, 300, 400, etc.) usable to allow a user to purchase an application. The payment module 518 may also be configured to receive and process payment information, generate appropriate billing information, and/or update user account information based on the received payments.

Once an application has been purchased, a control module 520 may cause transmission of the application or credential according to the delivery method specified in the request (if any). For instance, in the case of a meter application, the control module 520 may initiate transmission directly to the one or more smart sensors via the utility communication network. Alternatively, the control module 520 may initiate transmission to the utility supplier 110 or any other specified destination for subsequent distribution to the individual smart sensors. Initiating transmission may include the application store performing the transmission, or the application store instructing another computing device (e.g., a distribution computing device not shown) to perform the transmission.

In some embodiments, the memory 502 may also include a notification module 522 configured to provide notification of the availability of applications for utility meters or other smart sensors, consumer computing devices, and/or utility back office computing devices. Additional details of the notification module 522 and its functionality are described below in the section entitled "Example Notification of Application Availability."

The utility application store 102 also includes one or more communication connections 524 to enable the utility application store 102 to communicate with other computing devices locally or over the network 112. Examples of communication connections include, without limitation, power line communication (PLC) connections, Ethernet or other wired network connections, cellular communication connections, RF communication connections, or the like. As such, the utility application store 102 also includes any ancillary hardware, modules, and/or interfaces associated with or needed for the operation of the particular communication connections.

Example Smart Sensor

Figure 6:
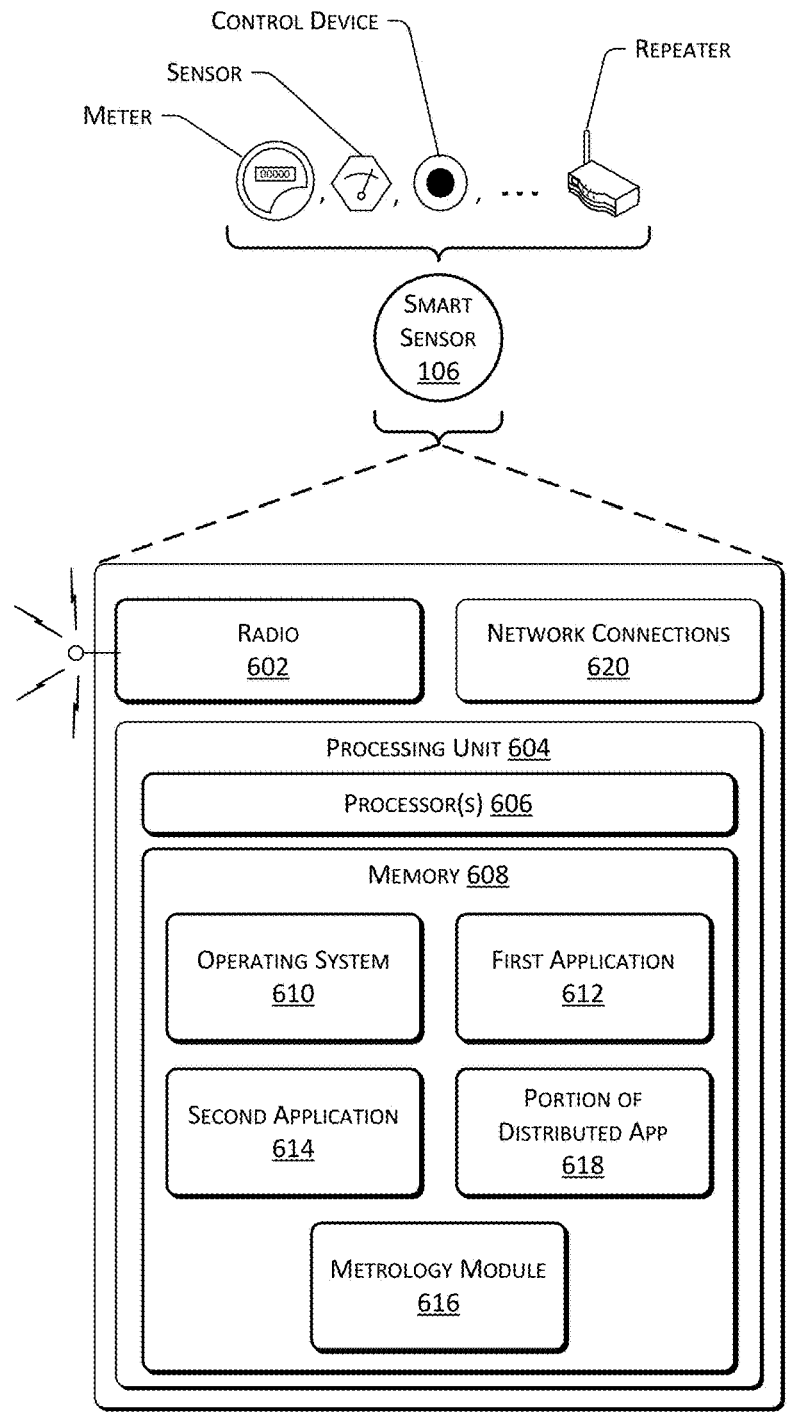
FIG. 6 is a block diagram illustrating details of one of the example smart sensors of FIG. 1.

FIG. 6 is a diagram showing example details of an individual smart sensor 106. As discussed above, the smart sensor may comprise a smart utility meter (e.g., electricity meter, water meter, or gas meter), a relay, a repeater, a smart grid router, a transformer, or any other utility network computing device. The smart sensor 106 may be configured for interaction with the utility application store 102, the utility supplier 110, as well as potentially other computing devices (e.g., consumer computing devices, utility network computing devices, web services, and the like). As noted above, in some examples, the smart sensor 106 may comprise a smart utility meter.

As shown in the example of FIG. 6, the smart sensor 106 may include a radio 602 and a processing unit 604. The radio 602 may provide two-way RF communication with other smart sensors 106 in the autonomous routing area 108 and/or other computing devices via the network 112. The processing unit 604 may include one or more processors 606 and memory 608 and/or other hardware device(s), such as an application specific integrated circuit (ASIC), a gate array or other hardware-based logic device. The memory 608 may include an operating system (OS) 610 and one or more applications. In the illustrated example, the memory 608 includes a first application 612 (e.g., a Voltage Quality Application to monitor voltage quality of service provided to the smart sensor 106), and a second application 614 (e.g., a Home Area Network Application allowing the smart sensor 106 to interface with a home area network hub installed in a user's home).

In embodiments in which the smart sensor 106 comprises a utility meter, the smart sensor 106 may include a metrology module 616 configured to receive consumption data of a resource (e.g., electricity, water, or gas) at a site of the meter. The metrology module 616 may report the consumption data to the central office 110 by RF transmission via the radio 602. The consumption data may be formatted and/or packetized in a manner or protocol for transmission over the utility communication network.

In addition to the radio 602, smart sensor 106 may include one or more other network connections 620, such as power line communications (PLC) connections, Ethernet or other wired network connections, RF connections, cellular communication connections, or the like. As such, the smart sensor 106 also includes any ancillary hardware, modules, and/or interfaces associated with or needed for the operation of the particular network connections.

The OS 610, the first application 612, the second application 614, the metrology module 616, and even software aspects of the radio 602 are all examples of applications that may be executable by the smart sensor 106. Such applications may be installed on the smart sensor 106 by/from the utility application store 102. The memory may also include a portion of a distributed application 618, other or related portions of which are executable by other computing devices (e.g., the utility application store 102, central office 110, other smart sensors 106, or other web services) to perform common or complimentary functions. Additional details of distributed applications are described below in the section entitled "Example Distributed Applications."

Memories 502 and 608 are shown to include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

While detailed examples of certain computing devices (e.g., utility application store 102 and smart sensors 106) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

The various memories described herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Methods of Installing or Activating Applications

Figure 7:
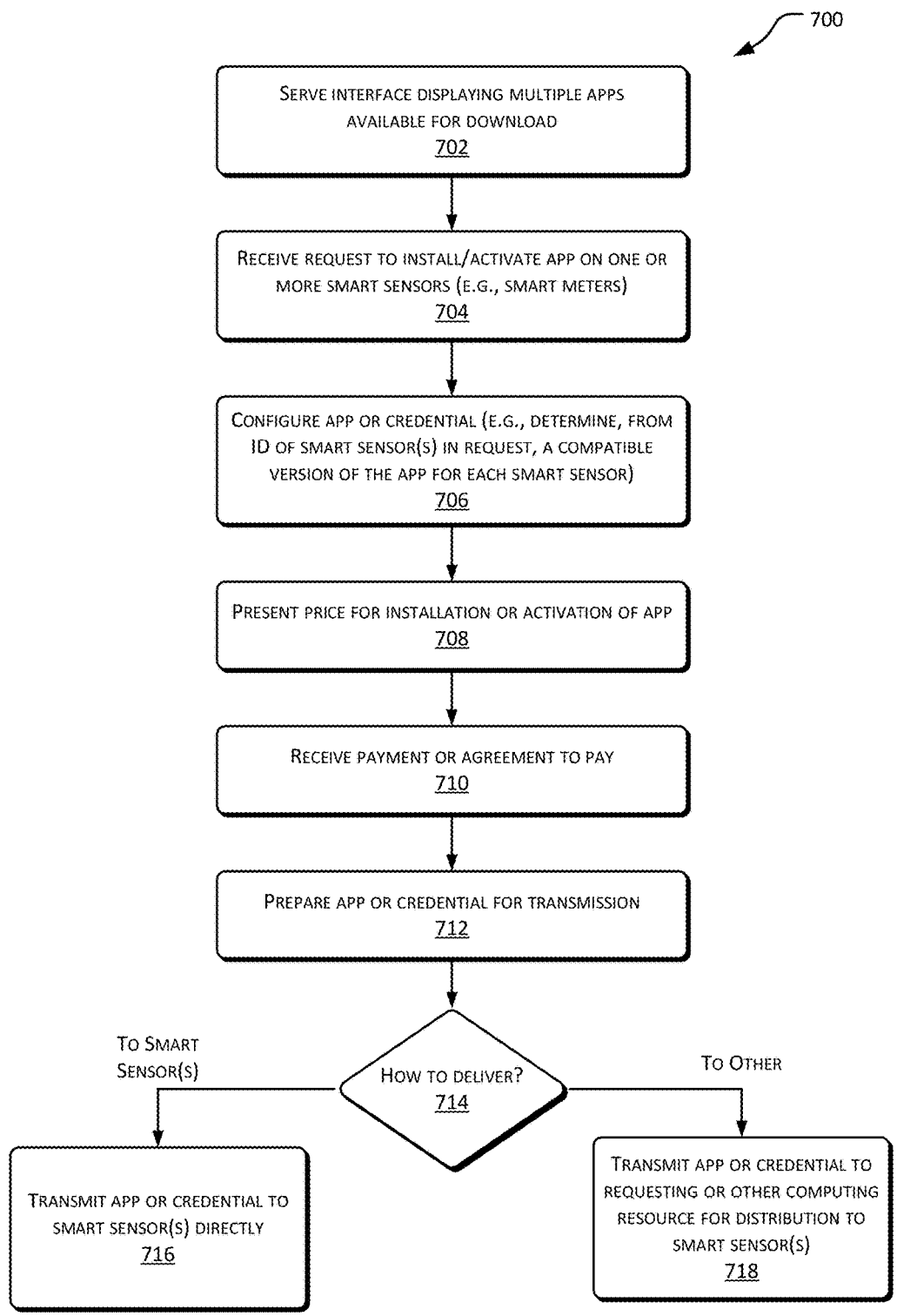
FIG. 7 is a flowchart of an example method that may be implemented by a utility application store to provide one or more applications for installation on one or more utility meters or other smart sensors.

FIG. 7 is a flowchart which illustrates an example flow of operations 700 that may be performed by a first computing resource, such as utility application store 102, to facilitate installation and/or activation of an application on one or more utility meters or other smart sensors. The example flow of operations 700 is described in the context of the example of architecture 100 and with reference to the devices illustrated in FIG. 1. However, the flow of operations 700 is not limited to use with the architecture 100 and devices of FIG. 1 and may be implemented using other architectures and devices.

The flow of operations 700 may begin, at block 702, with the first computing resource serving an interface displaying multiple applications that are available for download by a second computing resource. In some examples, the first computing resource may be administered by a first entity (e.g., an application store hosting company) and the second computing resource may be administered by a second entity (e.g., a utility supplier, consumer, etc.) that is different than the first entity. In one example, the first computing resource comprises one or more servers of an application store (e.g., utility application store 102) having multiple applications that are available for installation or activation, and the second computing resource comprises a personal computer, a mobile device, a utility meter reading device, or other computing device (e.g., other computing device 114). The one or more smart sensors (e.g., smart sensors 106) may include a predefined subset of a plurality of smart sensors in a utility supplier's communication network, such as all smart sensors of a certain type, all smart sensors within a geographical area, etc. In some embodiments, at least some of the smart sensors may include one or more smart utility meters.

At 704, the first computing resource (e.g., the utility application store 102) receives a request from the second computing resource (e.g., computing device 114) to install or activate an application on one or more smart sensors (e.g., one or more of smart sensors 106). In one example, the request may be in the form of selection of the "install/activate" control of the interface 116. In some instances, the application may include instructions to access metrology data collected by the smart sensor (e.g., to process the metrology data, to make the metrology data available, etc.).

The request may include an identifier for each of the one or more smart sensors. In some instances, the identifier may be a serial number or unique identifier of individual smart sensors. However, in other instances, the identifier may be a model name or number, a class or category of devices, or other indicator of device type. At 706, the first computing resource (e.g., utility application store 102) configures the application or a credential to activate the application for the one or more smart sensors based at least in part on the request. Configuring the application or credential for the one or more smart sensors may include, for example, determining, from the identifier of each of the one or more smart sensors, a compatible version of the application for each of the one or more smart sensors.

At 708, the first computing resource (e.g., utility application store 102) may present a price for installation or activation of the application on the one or more smart sensors. The price may be presented in the form, or as part, of a purchase interface (e.g., purchase interfaces 200, 300, or 400). At 710, the first computing resource receives payment or agreement to pay for the installation or activation of the application on the one or more smart sensors. In one example, payment or agreement to pay may be in the form of selection of a "Buy Now" or other purchase control on the purchase interface.

At 712, the first computing resource (e.g., utility application store 102) may prepare the application or credential for transmission to the one or more smart sensors by segmenting the application or credential into multiple segments, compressing the application or credential, and/or encrypting the application or credential. The specific segmenting, compressing, and/or encrypting operations may vary depending on the nature and requirements of the utility communication network and the selected delivery method. For instance, if the application or credential is to be delivered to a utility supplier, fewer preparation operations may be needed than if the application or credential is to be delivered to the individual smart sensors.

At 714, the first computing resource (e.g., utility application store 102) determines how to deliver the application or credential (e.g., based on a delivery method specified in the request, based on a default delivery method, a delivery method previously specified by the user, etc.) and causes transmission of the application (or the credential to activate the application) to the one or more smart sensors. Depending on the method of delivery specified in the request (if any), causing transmission of the application or the credential to the one or more smart sensors may include, at 716, transmitting the application or the credential to the one or more smart sensors directly, and/or, at 718, transmitting the application or credential to the second computing resource (e.g., computing device 114) or to another computing resource (e.g., utility supplier 110) for distribution to the one or more smart sensors. In one example, transmitting the application or the credential to the one or more smart sensors comprises sending a message including the application or the credential to the one or more smart sensors via a utility communication network.

Example Notification of Application Availability

Figure 8:
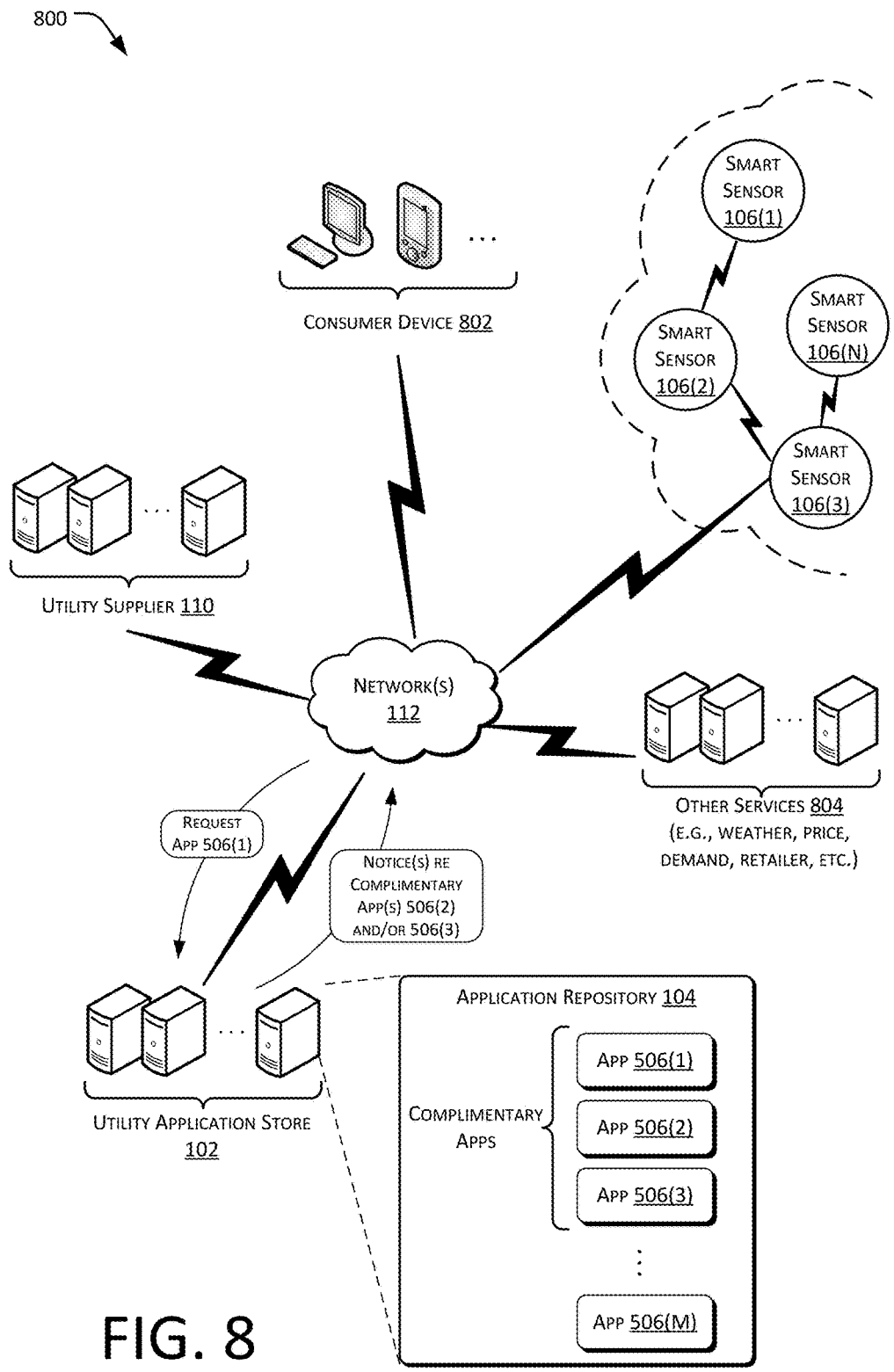
FIG. 8 is a schematic diagram of an example architecture which is usable to notify users of the existence of applications available for one or more computing devices.

FIG. 8 is a diagram illustrating another example networked environment or architecture 800, which is usable to provide notifications of the existence of applications that may be of interest to various users. For instance, the architecture 800 enables notification of users when applications are available for the users' devices, or when applications are installed on the users' devices.

Like the architecture 100 of FIG. 1, architecture 800 includes the utility application store 102 having the repository 104 of applications available for installation on one or more utility meters or other smart sensors 106. The architecture also includes the utility supplier 110 in communication with the utility application store 102 and the smart sensors 106 via the network 112. However, the architecture 800 of this example also includes a consumer computing device 802, such as a personal computer or mobile device, and one or more other services 804. The other services represent one or more computing devices and may include web services that provide data (e.g., weather services, sensor networks, resource pricing data, current resource demand data, etc.) or computing resources (e.g., cloud storage or processing resources, web hosting resources, analytic processing, calculations, validation, authentication, payment processing, etc.). Other services may also include retailers, manufacturers, suppliers, software developers, municipalities, or other entities that may provide or desire notice of the existence of applications for various computing devices.

The app store repository 104 may include applications 506(1)-506(M), some of which may be designed to run on smart sensors and some of which may be designed to run on one or more servers of the utility supplier 110, consumer computing devices 114, or other computing devices or "other services" 804. The applications may have been developed by an entity administering the application store 102, one or more utility meter or hardware manufacturers, one or more utility suppliers, one or more independent software vendors, and/or one or more providers of the other services 804.

When the utility application store 102 receives a request from a computing device to install an application, the utility application store 102 may be configured to notify the requesting computing device of the existence of one or more complimentary applications. Additionally or alternatively, the utility application store 102 may be configured to notify other computing devices of the existence of the requested application and/or the complimentary application(s). A complimentary application is one that is somehow related or associated with another application. In some instances, a complimentary application may be configured to receive and/or provide additional functionality and/or data to/from another application (e.g., an application for a utility meter that provides data to populate a complimentary smartphone application). In other instances, a complimentary application may be one that includes a feature similar or supplemental to a feature included in another application (e.g., an application that allows a utility meter to connect to a home area network via WiFi may be considered to be complimentary to an application that allows a utility meter to function as a WiFi hotspot).

Referring back to FIG. 8, some of the applications stored in the application repository 104 are designated as being complimentary applications (e.g., applications 506(1), 506(2), and 506(3)). This complimentary designation may be made in, for example, the application index 504 or metadata associated with the applications 506. Thus, upon receiving a request from a computing device for a first application 506(1), the utility application store 102 may notify one or more other computing devices of the existence of complimentary applications 506(2) and 506(3). Additionally or alternatively, the utility application store 102 may notify the one or more other computing devices of the existence of the first application 506(1) and/or that the first application 506(1) has been installed on the first computing device.

Figures 9A, 9B, 9C:
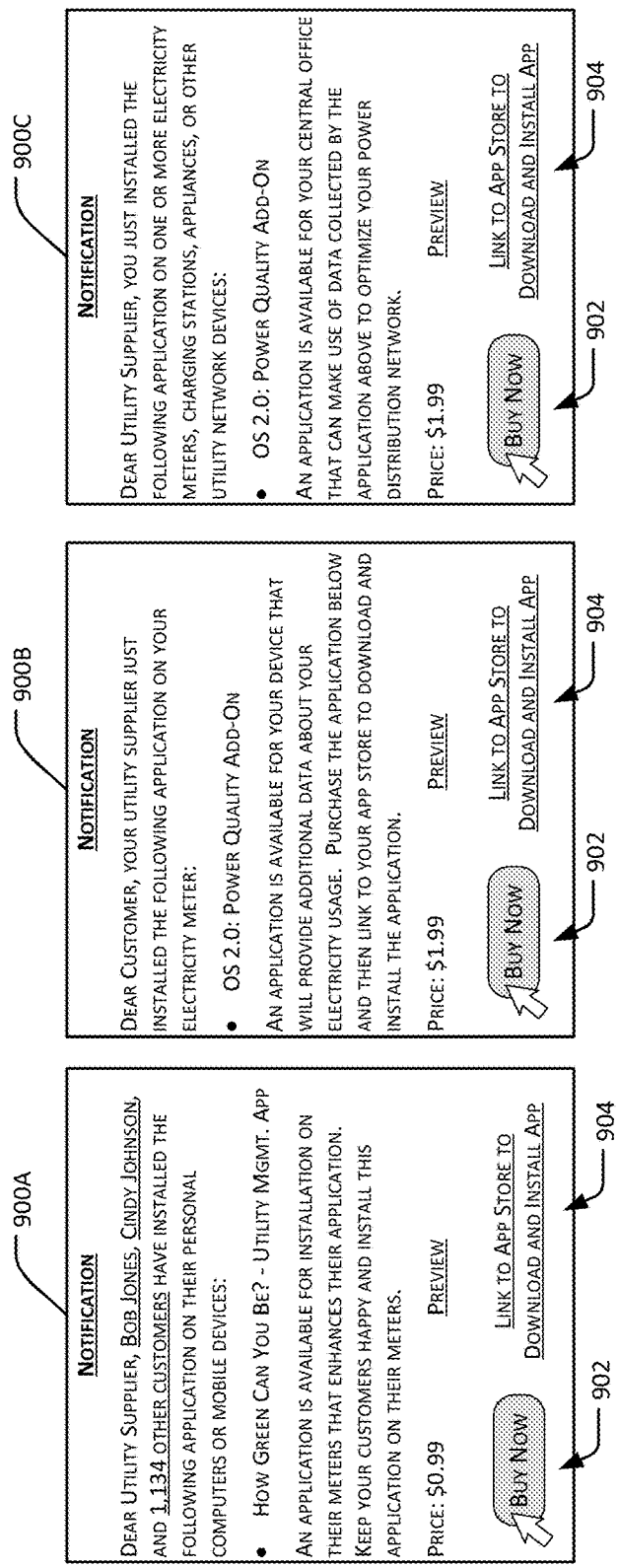
FIG. 9A is a schematic diagram of an example notification that may be used to notify a utility supplier of an application that is available for a utility meter.
FIG. 9B is a schematic diagram of an example notification that may be used to notify a customer of an application that is available for the customer's computing device.
FIG. 9C is a schematic diagram of an example notification that may be used to notify a utility supplier of an application that is available for a utility supplier computing device.

FIGS. 9A, 9B, and 9C illustrate three example notifications that may be provided informing various users of the existence of applications.

FIG. 9A illustrates a notification 900A that may be sent to a utility supplier informing the utility supplier that one or more of their customers have installed an application, "How Green Can You Be?—Utility Management Application," on their personal computer or mobile device. The notification 900A also informs the utility supplier that a complimentary application is available for their customer's utility meters that can enhance the application the customers have installed. For instance, the application for the utility meter may include an application programming interface (API) which the customers' application can call to obtain certain additional data or exercise certain functionality of the utility meter that would not otherwise be available to the customers.

In the illustrated example, the notification 900A also includes an indication of two specific customers, Bob Jones and Cindy Johnson, that have recently installed the application and a total number of customers that have installed the application. This information is shown underlined in FIG. 9A to indicate that additional information is available by, for example, selecting the underlined text. By selecting the underlined text, the utility supplier may obtain additional information about the specific customers, details of the installations and devices on which the application was installed, the number of installations, the times of installations, and the like. By providing this information, the utility supplier is able to determine how many customers would benefit from the installation of the meter application.

The notification 900A also includes a price field indicating a price of the application and a preview control allowing the user to preview the application prior to purchasing. The preview control may allow the user to link to screenshots, description, and/or demonstrations of the application. Additionally or alternatively, the preview control may allow the user to install a demo or trial version of the application. A purchase control 902, such the illustrated "Buy Now" button, may allow the user to purchase and install the application quickly and easily directly from the notification. Additionally or alternatively, the notification may include a link 904 to the utility application store 102 in order to install or activate the application.

FIG. 9B illustrates a notification 900B that may be sent to a customer, informing them that their utility supplier has installed an application (e.g., "OS 2.0: Power Quality Add-On") on the customer's utility meter. The notification also informs the customer that a complimentary application is available for the customer's personal computer or mobile device that can provide the customer with additional information about their utility consumption that was not previously available. As in the previous example, the notification 900B also includes a price field and a preview control.

In some instances, such as when the user accesses the notification from a personal computer, the customer may be able to purchase, download, and install the application directly from the notification to the personal computer. However, in other instances, such as when the user accesses the notification from smartphone or other mobile device, the user may need to navigate to an application store for the specific smartphone or mobile device (e.g., the iTunes® store or the Android® store). Accordingly, the notification 900B may include a link 904 to one or more device- or platform-specific application stores from which the application can be obtained.

FIG. 9C illustrates a notification 900C that may be sent to a utility supplier that has installed an application, "OS 2.0: Power Quality Add-On," on one or more utility meters. The notification also informs the utility supplier that a complimentary application is available for their central office servers that can make use of the data and functionality of the meter applications to optimize their power distribution network. As in the previous examples, the notification 900C also includes a price field and a preview control.

As in the example of FIG. 9A above, the notification 900C may include a purchase control 902, which may allow the user to purchase and install the application quickly and easily directly from the notification. Additionally or alternatively, the notification 900C may include a link 904 to the utility application store 102 in order to install or activate the application.

The foregoing examples envision that the customers and utility suppliers would each pay any applicable price for installing their own respective applications. In other embodiments, the utility supplier may subsidize the consumer application, or the consumers may subsidize installation of the application on their meters. That is, the meter application may be priced such that by paying for and installing the meter application, the consumer application may be offered to the customer for free and vice versa.

Figure 10:
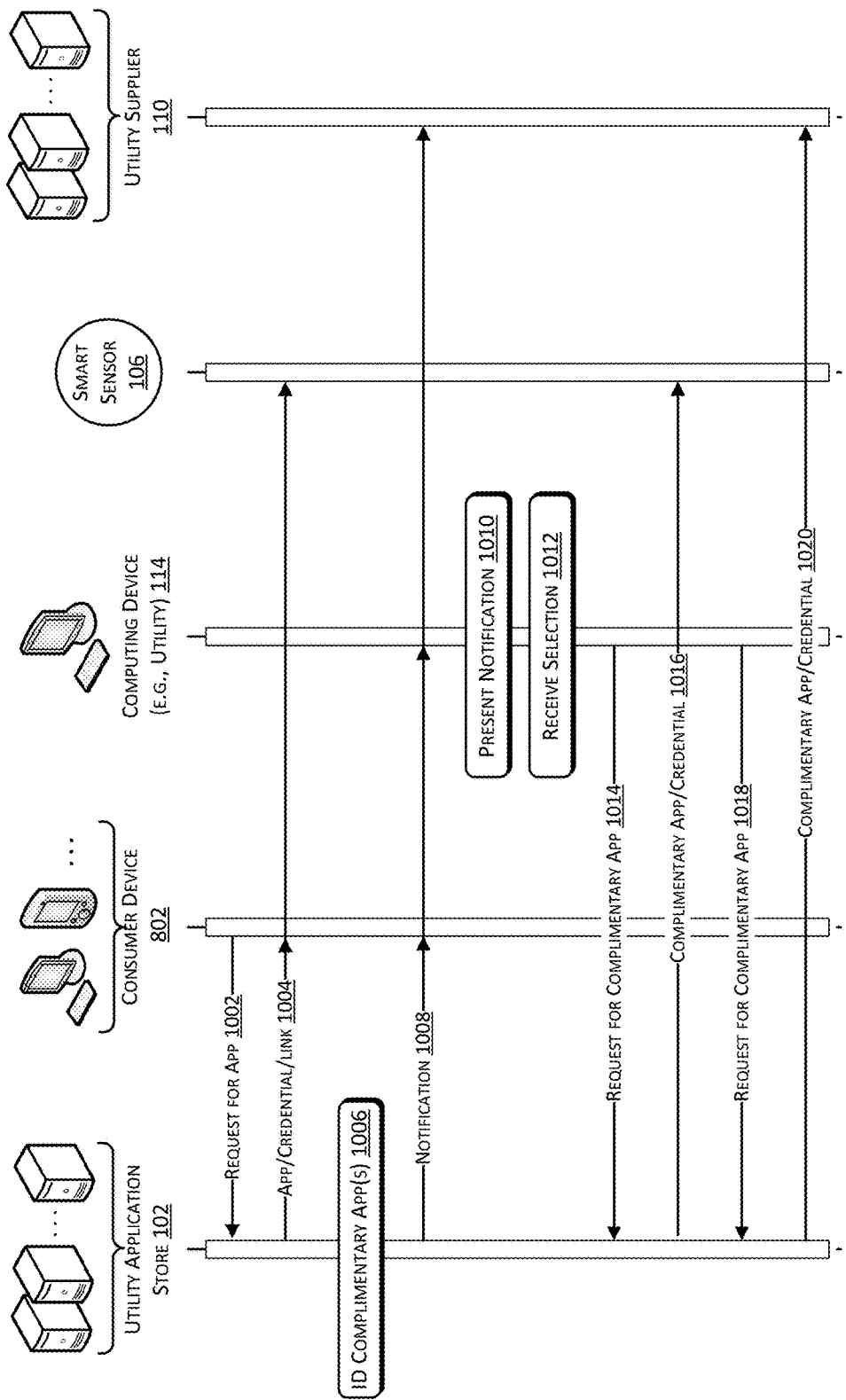
FIG. 10 is a signal flow diagram of an example method of notifying users of the existence of applications available for one or more computing devices.

FIG. 10 is a signal flow diagram which illustrates an example flow of operations 1000 that may be used to provide notification of the existence of applications for installation on one or more computing devices. The example flow of operations 1000 is described in the context of the example of architecture 800 and with reference to the devices illustrated in FIG. 8. However, the flow of operations 1000 is not limited to use with the architecture 800 and devices of FIG. 8 and may be implemented using other architectures and devices.

The flow of operations 1000 may begin, at block 1002, when a first computing device (e.g., utility application store 102) receives a request to install a first application on a second computing device (e.g., consumer device 802). At 1004, the first computing device may transmit the application, a credential to activate the application, or a link to download the application from another site (e.g., a client specific application store). The application, credential, and/or link may be transmitted to the requesting computing device (e.g., consumer device 802) or to another computing device (e.g., smart sensor 106).

The first computing device may also, at 1006, identify a second application, which is associated with the first application and is configured for execution by a third computing device (e.g., smart sensor 106, utility supplier 110, or another computing device not shown) of a type other than the second computing device. At 1008, the first computing device sends a notification of availability of the second application to one or more computing devices (e.g., consumer device 802, computing device 114, utility supplier 110, or another computing device not shown).

In some examples, the associated second application may comprise a complimentary application that is configured to receive and/or provide additional functionality and/or data to the first application. That is, the first application may be configured to interface with the second application to employ functionality and/or data of the second application, or vice versa.

In the illustrated example, the first computing device comprises utility application store 102, the second computing device comprises consumer device 802, and the third computing device comprises smart sensor 106. However, in other examples, the first, second, and third computing devices may comprise other computing devices. For instance, the third computing device may comprise other types of utility network computing device associated with a user or user account. A smart sensor is one example of a utility network computing device, but other examples of utility network computing devices include, without limitation, an electric vehicle charging station, a distributed generation source, a home area network device, a transformer, an appliance, an inverter, or the like. In another example, the second computing device may comprise a utility computing device (e.g., computing device 114) and may request installation of an application on a customer's utility meter. Upon receiving the request, the utility application store 102 may send a notification to the consumer's smartphone (i.e., the third computing device), informing the user of the existence of a complimentary application for the user's smartphone. In yet another example, a computing device other than utility application store 102 may provide the notification of complimentary applications.

In some examples, the notification may include a control usable to purchase the second application, a control usable to cause installation of the second application on the third computing device, and/or a control usable to access an application store from which the first application is installable by computing device. FIGS. 9A, 9B, and 9C illustrate three example notifications that may be provided at operation 1008. However, numerous other notifications may be used to notify other computing devices or users of the existence of applications.

At 1010, any of the computing devices having received the notification may present the notification on a display of the computing device. In the illustrated example, only the computing device 114 is shown as presenting the notification. However, the other computing devices receiving the notification (i.e., consumer device 802 and/or utility supplier 110) may additionally or alternatively present the notification. Subsequently, at 1012, the computing device(s) displaying the notification may receive user selection of a control of the notification presented on the display. Responsive to receiving the selection of the control, at 1014, the computing device(s) (e.g., computing device 114) may request that the first computing device (e.g., utility application store 102) transmit the second application to the computing device (computing device 114) or to another computing device (e.g., smart sensor 106).

At 1016, the first computing device may transmit the second application, or a credential to activate the second application, to the requesting computing device or, as shown in FIG. 10, to a device specified by the requesting device (e.g., smart sensor 106).

The first computing device may also have, at 1006, identified a third (or subsequent) application, which is associated with the first and/or second applications and is configured for execution by a fourth computing device (e.g., utility supplier 110, or another computing device not shown). In that case, the notification displayed at 1010 may have included notification of the existence of both the second and third applications, and the selection of the control received at 1012 may have applied to both the second and third applications. Accordingly, the computing device(s) having displayed the notification (e.g., computing device 114) may, at 1018, additionally request that the first computing device (e.g., utility application store 102) transmit the third application to another computing device (e.g., utility supplier 110).

At 1020, the first computing device may transmit the third application, or a credential to activate the third application, to the device specified by the requesting device (e.g., utility supplier 110).

Example Distributed Applications

Figure 11:
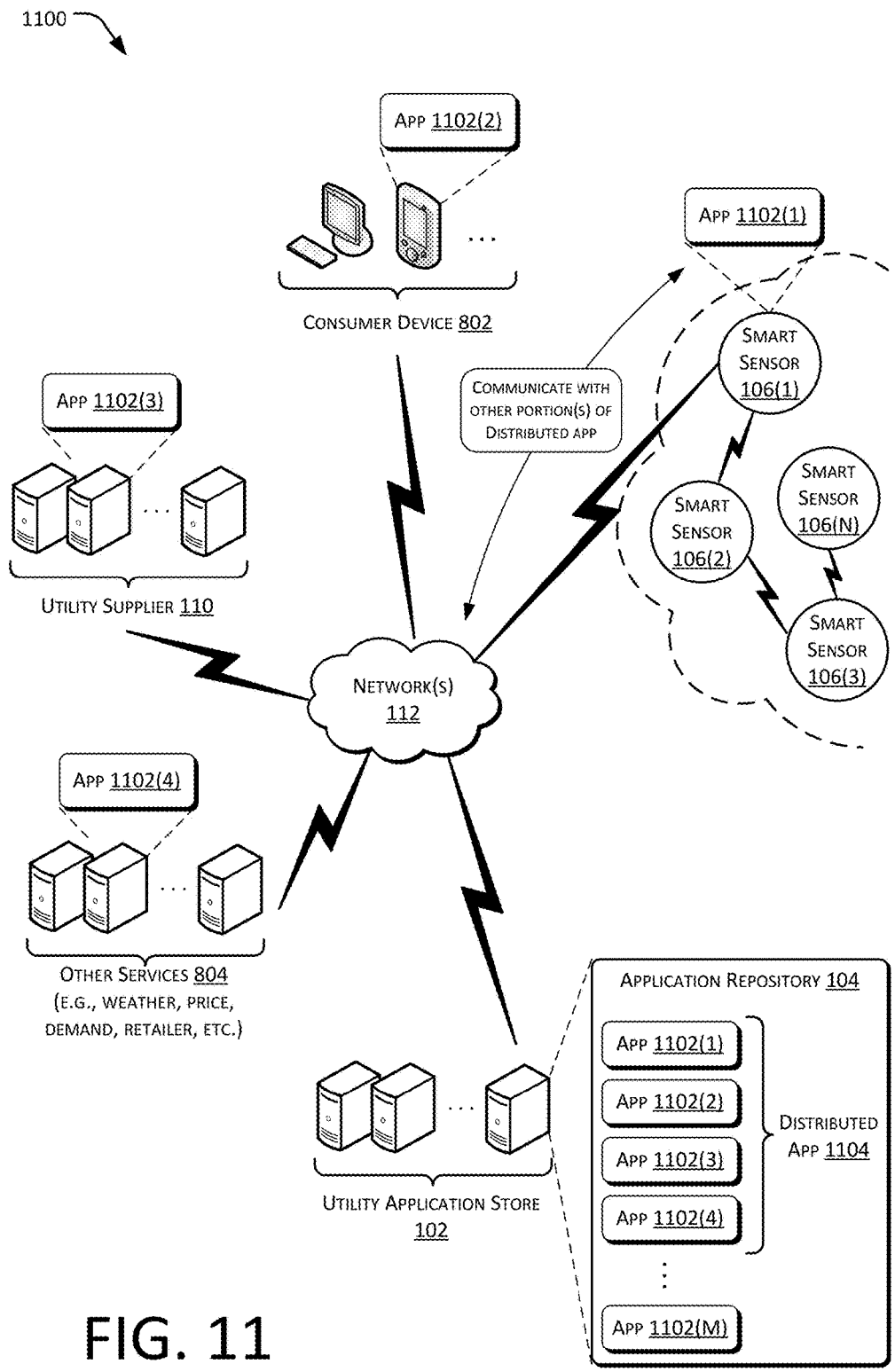
FIG. 11 is a schematic diagram of an example architecture in which a first portion of a distributed application is installed on a smart sensor and second portion of the distributed application is installed on another computing device.

FIG. 11 is a diagram illustrating another example networked environment or architecture 1100, illustrating the use of distributed applications amongst multiple computing devices. For instance, the architecture 1100 enables the distribution of multiple portions of a distributed application, which is executable by multiple different devices. For instance, a first portion of the distributed application may configured for execution by a first computing device, while one or more additional portions of the distributed application may be configured for execution by one or more additional computing devices that are separate from the first computing device. The first portion of the distributed application may be configured to interface with the one or more additional portions of the distributed application and to employ functionality and/or data of the one or more additional portions of the distributed application.

In some examples, at least some of the multiple different computing devices comprise different types of devices and/or devices running different operating systems. In one example, the first computing device comprises a smart utility meter and the one or more additional computing devices comprise a utility server, a cloud computing resource, a personal computer, a mobile device, an electric vehicle charger, a distributed generation source, a home area network device, a transformer, an appliance, and/or an inverter. In a further example, a portion of the distributed application may operate on the smart utility meter, and may communicate with another portion of the application which operates on a personal computer or mobile device. The portion of the distributed application running on the smart utility meter may access utility consumption data, while the portion of the application running on the personal computer or mobile device may provide a user interface accessible by a consumer, Like the architecture 800 of FIG. 8, architecture 1100 includes the utility application store 102 having the repository 104 of applications available for installation on one or more utility meters or other smart sensors 106. The architecture also includes the utility supplier 110, the consumer computing device 802, and the one or more other services 804 in communication with the utility application store 102 and the smart sensors 106 via the network 112.

However, in the architecture 1100, the application repository 104 of utility application store 102 includes applications 1102(1), 1102(2), 1102(3), 1102(4), . . . 1102(L) (collectively referred to as "applications 1102"), where L is any integer greater than or equal to 1. The applications 1102 include a subset of applications 1102(1)-1102(4) that together define a distributed application 1104. As such, the applications 1102(1)-1102(4) may be considered portions of the distributed application 1104. Each portion of the distributed application 1104 may be configured to perform certain operations independently. Additionally, each portion of the distributed application 1104 may also be configured to interface with one or more additional portions of the distributed application, and to employ functionality and/or data of the one or more additional portions of the distributed application.

The applications 1102(1)-1102(4) are also shown installed on multiple different devices of different types. For instance, application 1102(1), the first portion of the distributed application 1104, is installed on smart meter 106(1). Application 1102(2), the second portion of the distributed application 1104, is installed on consumer device 802. Application 1102(3), the third portion of the distributed application 1104, is installed on the utility supplier 110. And, application 1102(4), the fourth portion of the distributed application 1104, is installed on one of the other services 804. Each of these different devices, on which a portion of the distributed application 1104 runs, may comprise different hardware, different operating system, different software or versions of software, or the like. However, the various portions of the distributed application 1104 are able to interact with each other and leverage the data and/or processing capabilities of the other portions of the distributed application. In some examples, communication amongst the portions of the distributed application 1104 may be made possible by one or more application programming interfaces (APIs) presented by one or more portions of the distributed application that may be called by the other portions of the applications to implement certain functions and/or obtain certain data.

Figure 12:
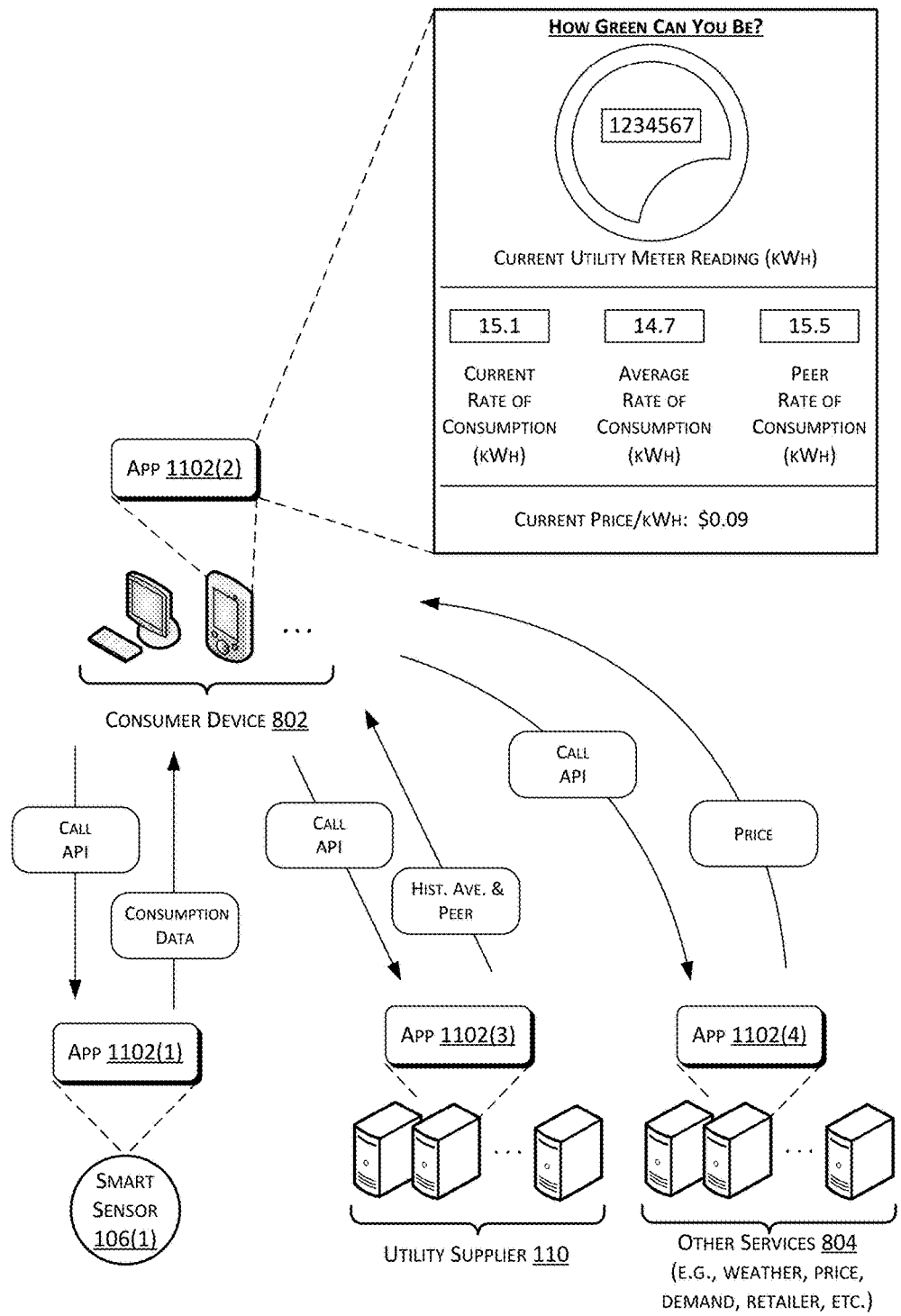
FIG. 12 is a schematic diagram of an example user interface of a portion of a distributed application executable on a consumer device, which interacts with a portion of the distributed application that is executable on a smart sensor.

FIG. 12 illustrates a simple example of a distributed application 1104 that may be used to perform an operation of informing a customer of his or her electricity consumption. In this example, application 1102(2) executing on the customer device 802 may call APIs of applications 1102(1), 1102(3), and 1102(4). In response to receiving the API call, the application 1102(1) executing on the smart sensor may report current resource consumption data (e.g., electricity usage) of a site at which the smart sensor 106(1) is installed. Similarly, the application 1102(3) executing on the central office 110 may report historical average resource consumption data (e.g., electricity usage) of the customer or the site. The application 1102(3) may additionally or alternatively report consumption data for one or more peers of the customer (e.g., nearby customers, customers with similar consumption patterns, etc.). The application 1102(4) executing on the other services 804 may provide current resource pricing data, for example. The application 1102(2) may then display the data received from the other portions of the distributed application 1104 on a screen of the consumer device 802. Accordingly, the distributed application utilizes the user interface of the consumer device, the consumption data of the smart meter, the pricing or historical consumption information of the central office, and the weather or other information of the other services to provide a unique combination of information that could not readily be provided by a single source. In another example, a distributed application could advantageously provide information to the utility supplier.

FIG. 12 is but one simple example of a distributed application. Numerous other examples are possible using the concept of distributed applications. Several other non-limiting examples are described briefly below. In one example, a first portion of a distributed application may be configured to execute on a utility meter or other smart sensor to collect and process resource consumption data. Compared to other computing resources, the utility meter or smart sensor may be somewhat constrained in terms of memory and/or processing resources. The first portion of the distributed application running on the utility meter or smart sensor may be configured to offload certain processing operations to a second portion of the distributed application running on a computing device which has greater processing power, such as the utility supplier servers or a cloud computing resource.

This offload of processing responsibilities may be implemented regularly or on an as needed basis.

In another example of a distributed application, a first portion of a demand response application may execute at the central office. The first portion of the demand response application may receive data from a second portion of the application that resides at a weather service and/or a third portion of the application that resides at an electricity distribution site. The data received from the second and third portions of the application may be used by the first portion to measure and predict resource demands. The first portion of the application may also communicate with a fourth portion of the application that resides on one or more utility meters, control points, or other smart sensors to regulate utility consumption at particular sites based on the measured and predicted resource demands.

Figure 13:
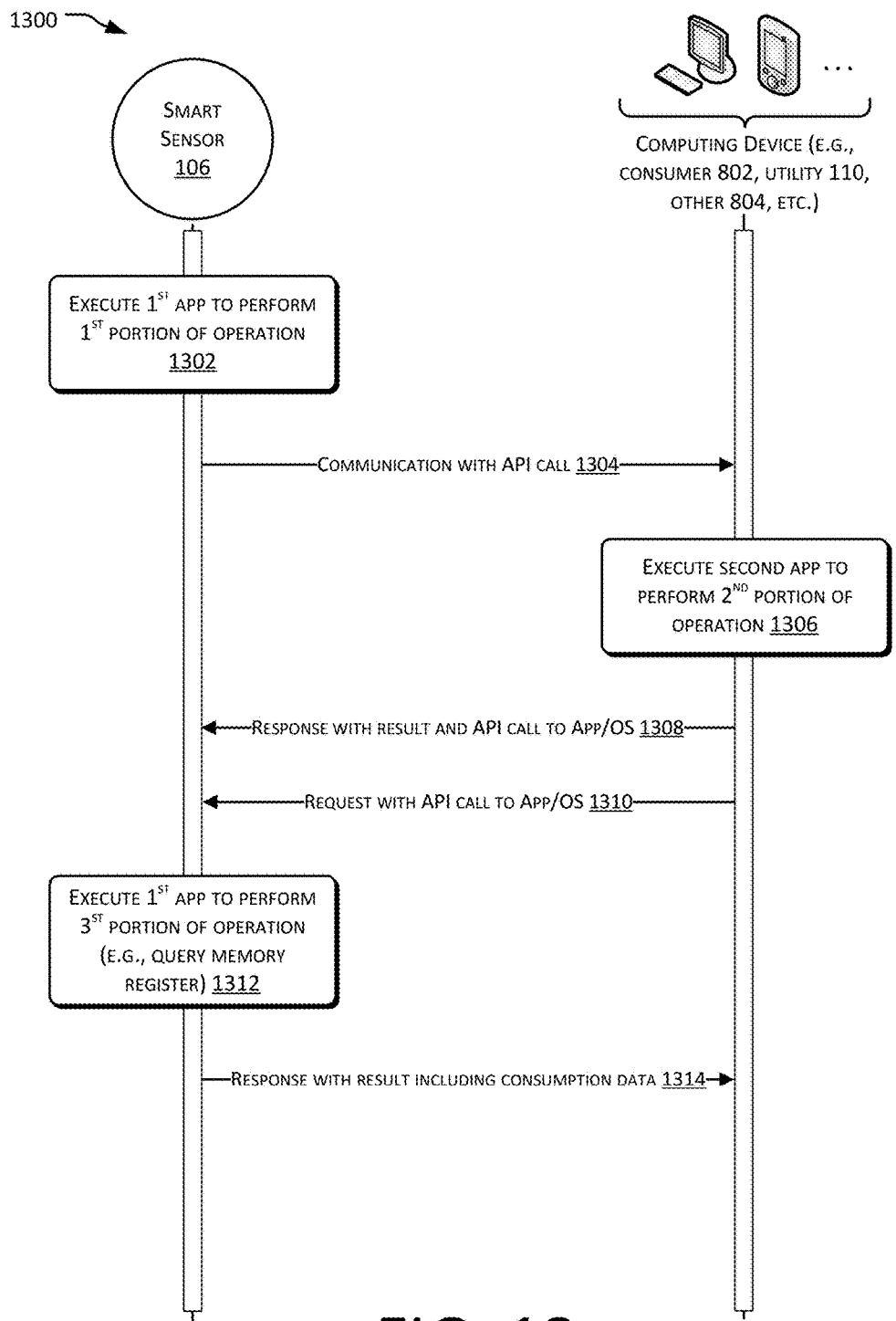
FIG. 13 is a signal flow diagram of an example method that may be implemented by a utility meter or other smart sensor executing a first portion of a distributed application, which interacts with a second portion of the distributed application executing on another computing device.

FIG. 13 is a signal flow diagram which illustrates an example flow of operations 1300 that may represent the signal flow between devices executing portions of one or more distributed applications. The portions of the distributed application may be configured to run concurrently on the multiple computing devices. The example flow of operations 1300 is described in the context of the example of architecture 1100 and with reference to the devices illustrated in FIG. 11. However, the flow of operations 1300 is not limited to use with the architecture 1100 and devices of FIG. 11 and may be implemented using other architectures and devices.

The flow of operations 1300 may begin, at block 1302, when a first computing device, such as a utility meter or other smart sensor 106, performs a first portion of an operation (e.g., measuring resource consumption). At 1304, the first computing device communicates with a second portion of the distributed application installed at a remote computing resource to cause performance by the remote computing resource of a second portion of the operation. The communication may include a call to an API of the second portion of the distributed application or remote computing resource to cause the remote computing resource to provide data and/or perform a processing operation. The remote computing resource may comprise consumer device 802, utility supplier 110, other computing service 804, or any other computing resource. Some examples of other computing resources include, without limitation, a utility server, a cloud computing resource, a personal computer, a mobile device, an electric vehicle charger, a distributed generation source, a home area network device, a transformer, an appliance, or an inverter.

At 1306, the remote computing resource may perform the second portion of the operation. The second portion of the operation may include any of a wide range of operations. In several non-limiting examples, the second operation may comprise presenting information on a display or obtaining weather information, resource pricing information, resource demand information, resource supply information, demographic data, or validation data. Additionally or alternatively, the second portion of the operation may comprise performing a processing operation (e.g., an offloaded operation of the first portion of the distributed application).

At 1308, the first computing resource may receive a response from the remote computing resource. The response may include a result of performance of the second portion of the operation by the remote computing resource (e.g., the data retrieved by execution of the second portion of the distributed application, a processing result of execution of the second portion of the distributed application, etc.). In some examples, the result may include a call to an API of the first portion of the distributed application or to an operating system of the first computing resource. In some examples, the first portion of the distributed application may run concurrently with the second portion of the distributed application.

At 1310, the first computing resource may receive a request from the remote computing resource (or another remote computing resource) to execute the first portion of the distributed application to perform a third part of the operation. The request may call an API of the first portion of the distributed application or an API of an operating system of the first computing resource. In one example, the third operation may comprise querying a memory or register of the first computing resource (e.g., smart sensor) for one or more sensor readings stored in a memory or register of the first computing resource. In the case where the first computing resource comprises a utility meter, the sensor readings stored in memory of the first computing resource may comprise, for example, resource consumption readings from a metrology module of the first computing resource. Responsive to receiving the request, the first computing resource may, at 1312, execute the first portion of the distributed application to perform the third part of the operation. At 1314, the first computing resource may communicate a result of execution of the first application to the second portion of the distributed application installed at the remote computing resource. In examples in which the first computing resource comprises a utility meter the result may include resource consumption data associated with a site of the utility meter.

While FIG. 13 illustrates implementation of a distributed application across only two computing devices, the techniques described with reference to FIG. 13 can readily be extended to distributed applications running across three, four, or even more computing devices.

The flows of operations illustrated in FIGS. 7, 10, and 13 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to execute the recited operations.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by an application store, the method comprising:
   receiving, at a computing device of the applications store, a request to install a first application on a utility network computing device;
   identifying, by the computing device of the application store and in response to receiving the request to install the first application, a second application that is available from the application store and is associated with the first application, the second application configured for execution by a mobile device or personal computer and the identifying being based on metadata associated with the first application or based on an application index accessible by the application store; and sending, by the application store, a notification of availability of the second application to the mobile device or personal computer, the notification comprising an indication that the first application has been installed on the utility network computing device, and that the second application is available for installation on the mobile device or personal computer.

2. The method of claim 1, wherein the second application comprises a complimentary application that is configured to receive, provide, or both receive and provide, additional functionality and/or data to the first application.

3. The method of claim 1, wherein the notification includes at least one of:
   a control usable to purchase the second application; or
   a control usable to cause installation of the second application on the mobile device or personal computer.

4. The method of claim 1, wherein the utility network computing device comprises a utility meter, an electric vehicle charging station, a distributed generation source, a home area network device, a transformer, an appliance, or an inverter.

5. The method of claim 1, further comprising outputting for display, a user interface accessible by the mobile device or personal computer.

6. The method of claim 5, wherein the user interface presents a plurality of applications that are available from the application store.

7. The method of claim 5, wherein the user interface includes multiple tabs that each represent a different category of applications of a plurality of categories available from the application store.

8. The method of claim 7, wherein the plurality of categories comprise meter applications, utility applications, consumer applications, and other applications.

9. The method of claim 1, wherein the request includes an identifier of the utility network computing device and the operations further comprise verifying, by the application store, that a compatible version of the first application exists for the utility network computing device based on the identifier.

10. The method of claim 1, wherein the notification further comprises:
   a control usable to purchase the second application;
   a control usable to access the application store; and
   a control usable to preview the second application.

11. A method implemented by an application store, the method comprising:
   receiving, at a computing device of the application store, a request to install a first application on a utility network computing device;
   identifying, by the computing device of the application store and in response to receiving the request to install the first application, a second application that is available from the application store and is associated with the first application, the second application configured for execution by a utility supplier computing device; and
   sending, by the application store, a notification of availability of the second application to the utility supplier computing device, the notification comprising an indication that the first application has been installed on the utility network computing device, and that the second application is available for installation on the utility supplier computing device.

12. The method of claim 11, wherein the second application comprises a complimentary application that is configured to receive, provide, or both receive and provide, additional functionality and/or data to the first application.

13. The method of claim 11, wherein the notification includes at least one of:
   a control usable to purchase the second application; or
   a control usable to cause installation of the second application on the utility supplier computing device.

14. The method of claim 11, wherein the utility network computing device comprises a utility meter, an electric vehicle charging station, a distributed generation source, a home area network device, a transformer, an appliance, or an inverter.

15. The method of claim 11, wherein the identifying is based on metadata associated with the first application or based on an application index accessible by the application store.

16. A utility supplier computing device comprising:
   one or more processors; and
   memory communicatively coupled to the one or more processors and storing instructions that are executable to perform operations comprising:
      receiving, at the utility supplier computing device, a notification of the availability of a first application which is:
         configured for execution by the utility supplier computing device or another device administered by a same utility supplier as the utility supplier computing device, and
         associated with a second application which has been installed on one or more utility network computing devices which are associated with one or more customers of the utility supplier; and
      presenting the notification on a display of the utility supplier computing device, the notification including at least an identifier of the one or more customers that are associated with the one or more utility network computing devices on which the second application has been installed.

17. The utility supplier computing device of claim 16, wherein the notification further comprises an indication of a number of utility network computing devices on which the second application has been installed.

18. The utility supplier computing device of claim 16, wherein the first application is configured to communicate with the second application to provide additional information to the second application.

19. The utility supplier computing device of claim 16, wherein the notification includes at least one of:
   a control usable to purchase the first application,
   a control usable to cause installation of the first application on the utility supplier computing device, or
   a control usable to access an application store from which the first application is installable by the utility supplier computing device.

20. The utility supplier computing device of claim 16, the operations further comprising:
   receiving selection of a control of the notification presented on the display; and
   responsive to receiving selection of the control, requesting that an application store transmit the first application to the utility supplier computing device.

* * * * *